United States Patent
Song et al.

(10) Patent No.: US 11,416,965 B2
(45) Date of Patent: Aug. 16, 2022

(54) IMAGE PROCESSING METHOD, RELATED DEVICE, AND COMPUTER STORAGE MEDIUM

(71) Applicant: Huawei Technologies Co., Ltd., Shenzhen (CN)

(72) Inventors: Yi Song, Shenzhen (CN); Peiyun Di, Shenzhen (CN); Saiping Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/090,394

(22) Filed: Nov. 5, 2020

(65) Prior Publication Data

US 2021/0049735 A1 Feb. 18, 2021

Related U.S. Application Data

(63) Continuation of application No. PCT/CN2019/085787, filed on May 7, 2019.

(30) Foreign Application Priority Data

May 7, 2018 (CN) .......................... 201810431381.7

(51) Int. Cl.
*G06K 9/00* (2022.01)
*G06T 3/40* (2006.01)
(Continued)

(52) U.S. Cl.
CPC .............. *G06T 3/4007* (2013.01); *G06T 7/74* (2017.01); *G06T 7/97* (2017.01)

(58) Field of Classification Search
CPC ............ G06T 3/4007; G06T 7/74; G06T 7/97
See application file for complete search history.

(56) References Cited

U.S. PATENT DOCUMENTS

2003/0077003 A1  4/2003  Ma
2008/0239146 A1  10/2008  Namioka
(Continued)

FOREIGN PATENT DOCUMENTS

CN  101436297 A  5/2009
CN  102129666 A  7/2011
CN  107230180 A  10/2017

OTHER PUBLICATIONS

JVET, "Algorithm descriptions of projection format conversion and video quality metrics in 360Lib Version 5," Joint Video Exploration Team (JVET) of ITU-T SG 16 WP 3 and ISO/IEC JTC 1/SC 29/WG 11, Document: JVET-H1004 (-v2), 8th Meeting: Macao, CN, Oct. 18-24, 2017, 43 pages.

(Continued)

*Primary Examiner* — Dhaval V Patel
(74) *Attorney, Agent, or Firm* — Conley Rose, P.C.

(57) ABSTRACT

An image processing method includes determining, based on a coordinate position of a to-be-interpolated sample in a target image, a first coordinate position of the to-be-interpolated sample in a source image, determining m reference samples based on the first coordinate position, determining an interpolation weight of each of the m reference samples for the to-be-interpolated sample based on a spherical distance between a coordinate position of each of the m reference samples and the first coordinate position, and determining a pixel value of the to-be-interpolated sample based on a pixel value corresponding to each of the m reference samples and the interpolation weight of each of the m reference samples for the to-be-interpolated sample to obtain the target image.

20 Claims, 12 Drawing Sheets

(51) Int. Cl.
G06T 7/73 (2017.01)
G06T 7/00 (2017.01)

(56) References Cited

U.S. PATENT DOCUMENTS

| | | | |
|---|---|---|---|
| 2009/0122084 A1* | 5/2009 | Yu .......................... | G06T 3/4007 |
| | | | 345/660 |
| 2012/0098965 A1* | 4/2012 | Barcala ............ | G08B 13/19689 |
| | | | 348/143 |
| 2014/0233847 A1* | 8/2014 | Ratcliff .............. | G06K 9/00228 |
| | | | 382/154 |

OTHER PUBLICATIONS

Boyce, J., et al.,"JVET common test conditions and evaluation procedures for 360 video," Joint Video Exploration Team (JVET) of ITU-T SG 16 WP 3 and ISO/IEC JTC 1/SC 29/WG 11, Document: JVET-H1030, 8th Meeting: Macao, CN, Oct. 18-24, 2017, 8 pages.

* cited by examiner

IMAGE PROCESSING METHOD, RELATED DEVICE, AND COMPUTER STORAGE MEDIUM

CROSS-REFERENCE TO RELATED APPLICATIONS

This application is a continuation of International Patent Application No. PCT/CN2019/085787 filed on May 7, 2019, which claims priority to Chinese Patent Application No. 201810431381.7 filed on May 7, 2018. The disclosures of the aforementioned applications are hereby incorporated by reference in their entireties.

TECHNICAL FIELD

The present disclosure relates to the field of image processing technologies, and in particular, to an image processing method, a related device, and a computer storage medium.

BACKGROUND

An image interpolation algorithm is a traditional algorithm of image scaling in modern digital image processing, and mainly includes a nearest-neighbor interpolation algorithm and a bilinear interpolation algorithm. However, these image interpolation algorithms are all proposed for planar images, and have better performance in planar image processing. These image interpolation algorithms are not applicable to non-planar images (curved surface images), for example, 360-degree images (panoramic images), and other large-view images.

In practice, it is found that, if an existing image interpolation algorithm is used to perform image interpolation on a non-planar image, image interpolation efficiency and performance are greatly reduced.

SUMMARY

Embodiments of the present disclosure disclose an image processing method, a related device, and a computer storage medium, to resolve a problem in the other approaches that image interpolation performance and efficiency are reduced when a planar image algorithm is used to perform image processing on a non-planar image.

According to a first aspect, an embodiment of the present disclosure provides an image interpolation method. The method includes determining, based on a coordinate position of a to-be-interpolated sample in a target image, a first coordinate position of the to-be-interpolated sample in a source image, where the source image is a to-be-converted curved surface image or a to-be-converted planar image in a spherical image format, and the target image is an image obtained through conversion from the source image, determining m reference samples based on the first coordinate position, where the m reference samples are located in the source image, and m is a positive integer, determining an interpolation weight of each of the m reference samples for the to-be-interpolated sample based on a spherical distance between a coordinate position of each of the m reference samples and the first coordinate position, and determining a pixel value of the to-be-interpolated sample based on a pixel value corresponding to each of the m reference samples and the interpolation weight of each of the m reference samples for the to-be-interpolated sample, to obtain the target image.

In some embodiments, the target image is a curved surface image or a planar image in a spherical image format.

In some embodiments, spherical image formats corresponding to the source image and the target image are different, and/or image resolutions corresponding to the source image and the target image are different. Further, when both the source image and the target image are planar images in a spherical image format, spherical image formats corresponding to the source image and the target image are different.

In some embodiments, the m reference samples are obtained through sampling around the first coordinate position along a longitude direction and/or a latitude direction. Vertical coordinates or latitude coordinates of some of the m reference samples are the same, and/or horizontal coordinates or longitude coordinates of some of the m reference samples are the same. All coordinate positions corresponding to the m reference samples are not the same, that is, the m reference samples include samples with a same coordinate position.

In some embodiments, the source image is a planar image in a spherical image format, and the first coordinate position is a position of a point including a horizontal coordinate and a vertical coordinate in a planar coordinate system. The longitude direction is determined based on a position mapping relationship between a geographic coordinate system and the plane coordinate system of the source image, and latitude values corresponding to coordinate positions of the source image in the longitude direction remain unchanged, and the latitude direction is determined based on a position mapping relationship between the geographic coordinate system and the plane coordinate system of the source image, and longitude values corresponding to coordinate positions of the source image in the latitude direction remain unchanged.

In some embodiments, the longitude direction is a direction in which latitude coordinates remain unchanged in the geographic coordinate system, and is determined in the source image based on the position mapping relationship between the geographic coordinate system and the plane coordinate system of the source image.

In some embodiments, the latitude direction is a direction in which longitude coordinates remain unchanged in the geographic coordinate system, and is determined in the source image based on the position mapping relationship between the geographic coordinate system and the plane coordinate system of the source image.

In some embodiments, a spherical distance between a coordinate position of any one of the m reference samples and the first coordinate position includes a first spherical distance and a second spherical distance, the first spherical distance is a spherical distance between the coordinate position of the any reference sample and the first coordinate position in the longitude direction, and the second spherical distance is a spherical distance between the coordinate position of the any reference sample and the first coordinate position in the latitude direction, and determining an interpolation weight of each of the m reference samples for the to-be-interpolated sample based on a spherical distance between a coordinate position of each of the m reference samples and the first coordinate position includes determining a unit distance, where the unit distance includes a first unit distance and a second unit distance, the first unit distance is a distance between a first reference sample and a second reference sample in the longitude direction, and the second unit distance is a distance between the third reference sample and the fourth reference sample in a latitude direction, and determining the interpolation weight of each of the m reference samples for the to-be-interpolated sample based on the unit distance and the spherical distance between the coordinate position of each of the m reference samples and the first coordinate position.

In some embodiments, the first reference sample and the second reference sample are two reference samples, closest to the first coordinate position (which may be a longitude coordinate corresponding to the first coordinate position), in the m reference samples in the longitude direction. Optionally, the first reference sample and the second reference sample correspond to a same latitude coordinate.

In some embodiments, the third reference sample and the fourth reference sample are two reference samples, closest to the first coordinate position (which may be a latitude coordinate corresponding to the first coordinate position), in the m reference samples in the latitude direction. Optionally, the third reference sample and the fourth reference sample correspond to a same longitude coordinate.

In some embodiments, the first unit distance $Ud_\phi$ may be calculated based on the following formula:

$$Ud_\phi = |\phi_A - \phi_B| \cdot R \cos \lambda_A.$$

A coordinate position of the first reference sample A is ($\phi_A$, $\lambda_A$). A coordinate position of the second reference sample B is ($\phi_B$, $\lambda_B$). The first coordinate position is ($\phi$, $\lambda$). R is a radius of a sphere corresponding to the source image. On a unit sphere, R is usually equal to 1. $\phi$ is a longitude coordinate, and $\lambda$ is a latitude coordinate.

In some embodiments, the second unit distance $Ud_\lambda$ may be calculated based on the following formula:

$$Ud_\lambda = |\lambda_C - \lambda_D| \cdot R.$$

A coordinate position of the third reference sample C is ($\phi_C$, $\lambda_C$). A coordinate position of the fourth reference sample D is ($\phi_D$, $\lambda_D$). R is a radius of a sphere corresponding to the source image. On a unit sphere, R is usually equal to 1. $\phi$ is a longitude coordinate, and $\lambda$ is a latitude coordinate.

In some embodiments, the first spherical distance $d_{\phi_{ij}}$ and the second spherical distance $d_{\lambda_{ij}}$ may be calculated correspondingly based on the following formulas:

$$d_{\phi_{ij}} = |\phi - \phi_{ij}| \cdot R \cos \lambda, \text{ and}$$

$$d_{\lambda_{ij}} = |\lambda - \lambda_{ij}| \cdot R.$$

A coordinate position of the any reference sample is ($\phi_{ij}$, $\lambda_{ij}$). A first coordinate position is ($\phi$, $\lambda$).

In some embodiments, determining the interpolation weight of each of the m reference samples for the to-be-interpolated sample based on the unit distance and the spherical distance between the coordinate position of each of the m reference samples and the first coordinate position includes determining a first weight component of each of the m reference samples for the to-be-interpolated sample based on the first unit distance and a first spherical distance between a coordinate position of each of the m reference samples and the first coordinate position, determining a second weight component of each of the m reference samples for the to-be-interpolated sample based on the second unit distance and a second spherical distance between a coordinate position of each of the m reference samples and the first coordinate position, and determining the interpolation weight of each of the m reference samples for the to-be-interpolated sample based on the first weight component of each of the m reference samples for the to-be-interpolated sample and the second weight component of each of the m reference samples for the to-be-interpolated sample.

In some embodiments, determining a first weight component of each of the m reference samples for the to-be-interpolated sample based on the first unit distance and a first spherical distance between a coordinate position of each of the m reference samples and the first coordinate position includes determining the first weight component of each of the m reference samples for the to-be-interpolated sample based on an image interpolation algorithm, the first unit distance, and the first spherical distance between the coordinate position of each of the m reference samples and the first coordinate position.

In some embodiments, a first weight component $L_{\phi_{ij}}$ of any one of the m reference samples for the to-be-interpolated sample may be calculated based on the following formula:

$$L_{\phi_{ij}} = \delta\left(\frac{d_{\phi_{ij}}}{Ud_{\phi_{ij}}}\right).$$

$Ud_\phi$ is the first unit distance, $d_{\phi_{ij}}$ is the first spherical distance, and $\delta$ is the image interpolation algorithm.

In some embodiments, determining a second weight component of each of the m reference samples for the to-be-interpolated sample based on the second unit distance and a second spherical distance between a coordinate position of each of the m reference samples and the first coordinate position includes determining the second weight component of each of the m reference samples for the to-be-interpolated sample based on the image interpolation algorithm, the second unit distance, and the second spherical distance between the coordinate position of each of the m reference samples and the first coordinate position.

In some embodiments, a second weight component $L_{\lambda_{ij}}$ of any one of the m reference samples for the to-be-interpolated sample may be calculated based on the following formula:

$$L_{\lambda_{ij}} = \delta\left(\frac{d_{\lambda_{ij}}}{Ud_{\lambda_{ij}}}\right).$$

$Ud_\lambda$ is the second unit distance, $d_{\lambda_{ij}}$ is the second spherical distance, and $\delta$ is the image interpolation algorithm.

In some embodiments, an interpolation weight $L(\phi_{ij}, \lambda_{ij})$ of any one of the m reference samples for the to-be-interpolated sample may be calculated based on the following formula:

$$L(\phi_{ij}, \lambda_{ij}) = L_{\phi_{ij}} \times L_{\lambda_{ij}} L(\phi_{ij}, \lambda_{ij}) = L_{\phi_{ij}} \times L_{\lambda_{ij}}.$$

In some embodiments, a pixel value $P_o$ of the to-be-interpolated sample may be obtained based on the following formula:

$$P_o = \sum_{j=1}^{b} \sum_{i=1}^{a} L(\phi_{ij}, \lambda_{ij}) \times P_{ij}.$$

$P_o$ is the pixel value of the to-be-interpolated sample. $P_{ij}$ is a pixel value of any one of the m reference samples. $L(\phi_{ij}, \lambda_{ij})$ is an interpolation weight of the any reference sample for the to-be-interpolated sample. a is a quantity of reference samples obtained through sampling in the longitude direction. b is a quantity of reference samples obtained through sampling in the latitude direction. a×b=m, and a, b, and m are all positive integers.

In some embodiments, the longitude direction is a direction in which longitude coordinate values change fastest, or the longitude direction is a direction in which latitude coordinate values remain unchanged.

In some embodiments, the latitude direction is a direction in which latitude coordinate values change fastest, or the latitude direction is a direction in which longitude coordinate values remain unchanged.

In some embodiments, the coordinate position is a position of a point including a horizontal coordinate and a vertical coordinate in a plane coordinate system of the planar image, or is a position of a point including a longitude coordinate and a latitude coordinate in a geographic coordinate system of the curved surface image.

According to a second aspect, an embodiment of the present disclosure provides a terminal device, including a processing unit.

The processing unit is configured to determine, based on a coordinate position of a to-be-interpolated sample in a target image, a first coordinate position of the to-be-interpolated sample in a source image. The source image is a to-be-converted curved surface image or a to-be-converted planar image in a spherical image format. The target image is an image obtained through conversion from the source image.

The processing unit is further configured to determine m reference samples based on the first coordinate position. The m reference samples are located in the source image, and m is a positive integer.

The processing unit is further configured to determine an interpolation weight of each of the m reference samples for the to-be-interpolated sample based on a spherical distance between a coordinate position of each of the m reference samples and the first coordinate position.

The processing unit is further configured to determine a pixel value of the to-be-interpolated sample based on a pixel value corresponding to each of the m reference samples and the interpolation weight of each of the m reference samples for the to-be-interpolated sample, to obtain the target image.

In some embodiments, a spherical distance between a coordinate position of any one of the m reference samples and the first coordinate position includes a first spherical distance and a second spherical distance, the first spherical distance is a spherical distance between the coordinate position of the any reference sample and the first coordinate position in the longitude direction, and the second spherical distance is a spherical distance between the coordinate position of the any reference sample and the first coordinate position in the latitude direction.

The processing unit is configured to determine a unit distance. The unit distance includes a first unit distance and a second unit distance, the first unit distance is a distance between a first reference sample and a second reference sample in the longitude direction, and the second unit distance is a distance between a third reference sample and a fourth reference sample in a latitude direction.

The processing unit is configured to determine the interpolation weight of each of the m reference samples for the to-be-interpolated sample based on the unit distance and the spherical distance between the coordinate position of each of the m reference samples and the first coordinate position.

In some embodiments, the terminal device further includes a communications unit. The communications unit is configured to transmit an image, for example, obtain the source image or send the target image.

For content that is not shown or described in this embodiment of the present disclosure, refer to the foregoing descriptions in the method embodiment in the first aspect. Details are not described herein again.

According to a third aspect, an embodiment of the present disclosure provides another terminal device, including a memory and a processor coupled to the memory. The memory is configured to store an instruction. The processor is configured to execute the instruction. When executing the instruction, the processor executes the method described in the first aspect.

In some embodiments, the terminal device further includes a display coupled to the processor, and the display is configured to display an image (which may be a target image or a source image) under control of the processor.

In some embodiments, the terminal device further includes a communications interface. The communications interface communicates with the processor, and the communications interface is configured to communicate with another device (for example, a network device) under control of the processor.

According to a fourth aspect, a computer-readable storage medium is provided. The computer-readable storage medium stores program code used for service switching processing. The program code includes an instruction used to execute the method described in the first aspect.

Implementing the embodiments of the present disclosure can resolve a problem in the other approaches that image interpolation performance and efficiency are reduced when a planar image interpolation algorithm is used to perform image processing on a non-planar image (curved surface image), thereby effectively improving non-planar image interpolation performance and efficiency.

BRIEF DESCRIPTION OF DRAWINGS

To describe the technical solutions in some of the embodiments of the present disclosure more clearly, the following briefly describes the accompanying drawings for describing some of the embodiments.

DESCRIPTION OF EMBODIMENTS

Figure 1A:
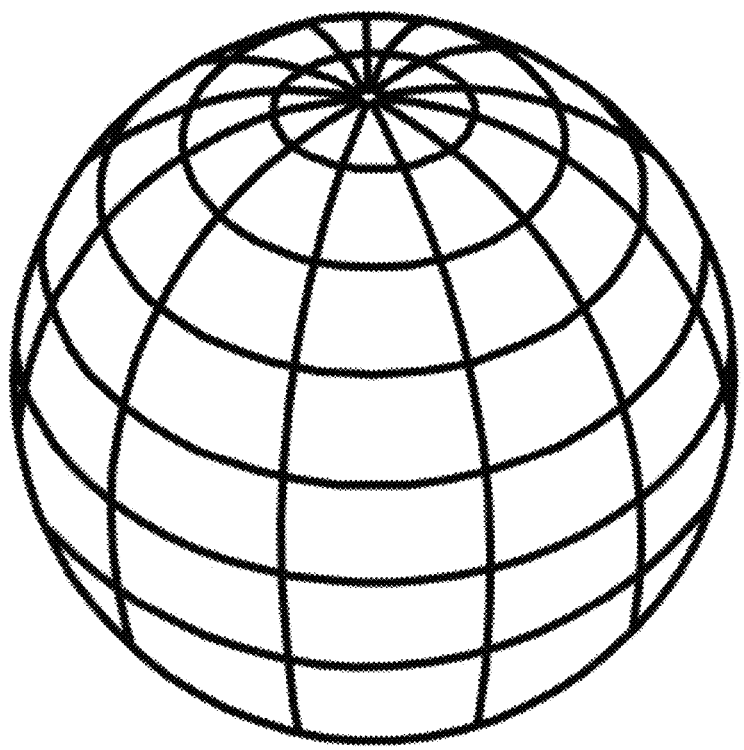
FIG. 1A is a schematic diagram of a spherical image according to an embodiment of this application.

The following describes the technical solutions in the embodiments of the present disclosure in detail with reference to the accompanying drawings in the present disclosure.

First, some technical terms used in this application are described.

Panoramic video: is also referred to as a 360-degree panoramic video or a 360-degree video, and is a video shot by a plurality of cameras in a 360-degree omni-directional manner. When viewing the video, a user can randomly adjust a viewing angle of the user. A frame image that constitutes the panoramic video may be referred to as a panoramic image or a 360-degree image.

Large-angle-of-view video: is a video whose angle-of-view coverage is excessively large, for example, an angle-of-view coverage of a video is 360° or 720°. Correspondingly, a frame image that constitutes the large-angle-of-view video may be referred to as a large-angle-of-view image.

Interpolation: New data points are constructed based on known discrete data points, and this is referred to as interpolation.

Integer sample: is a sample whose coordinate position in a reference coordinate system is an integer in an image.

Fractional sample: is a sample whose coordinate position in a reference coordinate system is non-integer in an image.

Sample: An image is partitioned into finer grids or points. Each grid or point is referred to as a sample. For ease of description of the patent of this application, a sample is used as a general term of an integer sample and a fractional sample. That is, in this application, the sample may be an integer sample or a fractional sample, and a sample with a specific requirement is described in detail in the following.

Reference sample: is also referred to as an interpolation reference sample, and is a sample (which is also referred to as a to-be-interpolated sample) used to generate a to-be-interpolated sample in an image pixel interpolation process. The reference sample is usually selected from a specified region closest to the to-be-interpolated sample, and is described in detail in the following.

Plane rectangular coordinate system is also referred to as a plane coordinate system or a rectangular coordinate system, and is a coordinate system including two number axes that are perpendicular to each other and have a common origin on a same plane. One of the two axes is placed horizontally, and the other axis is placed vertically. A vertical number axis is usually referred to as a y-axis or a vertical axis, and a horizontal number axis is usually referred to as an x-axis or a horizontal axis. Correspondingly, a position (coordinate position) of a point in the plane coordinate system may be represented by a horizontal coordinate of the point in a direction x and a vertical coordinate of the point in a direction y.

Geographic coordinate system: a spherical coordinate system that uses longitude and latitude to represent a position of a ground point. In the geographic coordinate system, a horizontal line (or an east-west line) is a latitude line. In the geographic coordinate system, a vertical line (or a north-south line) is a longitude line. A position (a coordinate position) of a point in the geographic coordinate system may be represented by a longitude coordinate (a longitude value or a longitude coordinate value) of the point in a longitude direction and a latitude coordinate (a latitude value or a latitude coordinate value) of the point in a latitude direction. The longitude direction is a direction in which longitude coordinate values change fastest, or may be a direction in which latitude coordinate values remain unchanged. The latitude direction is a direction in which latitude coordinate values change fastest, or may be a direction in which longitude coordinate values remain unchanged.

Great circle: is also referred to as a big circle, and is defined as "intersection of the sphere and a plane that passes through the center point of the sphere. Note 1: A great circle is also known as an orthodrome or Riemannian circle. Note 2: The center of the sphere and the center of a great circle are co-located."

Planar image: is an image in a plane coordinate system, that is, all parts of the image are located on a same plane.

Curved surface image: is also referred to as a non-planar image in which all parts of the image are not located on a plane at the same time. Generally, because a large-angle-of-view image covers a comparatively large angle of view, the large-angle-of-view image is in essence a curved surface image. For example, a 360-degree image (a panoramic image) is a type of curved surface image, and is also referred to as a spherical image. Further, FIG. 1A is a schematic diagram of a spherical image.

Figure 1B:
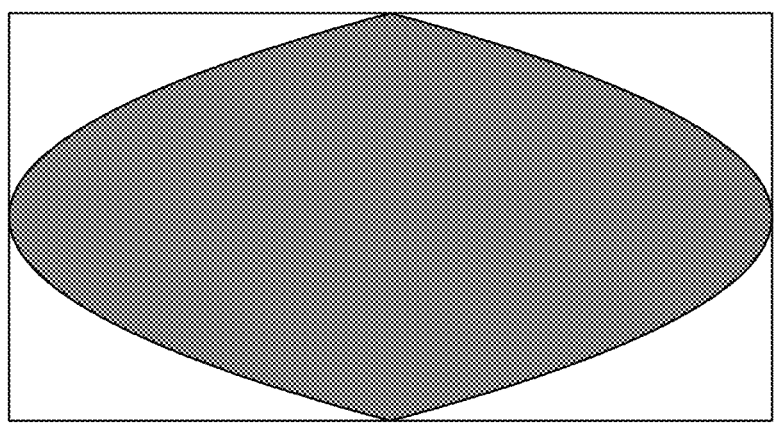
FIG. 1B is a schematic diagram of a planar image in a spherical image format according to an embodiment of the present disclosure.

Spherical image format: is a storage or transmission format of an image, and is described in detail below in this application. For example, FIG. 1B is a schematic diagram of a planar image in a spherical image format. A black region in FIG. 1B may be understood as an image region presented after some curved surface images are mapped to a planar image. Details are not described herein.

Because an angle of view range covered by a large-angle-of-view video (image) is excessively large, the large-angle-of-view video (image) is in essence a curved surface image (that is, a non-planar image). For example, a panoramic image is in essence a spherical panoramic image. Deformation occurs in an image processing process of a large-angle-of-view image. For example, when a large-angle-of-view image (a non-planar image) is converted/mapped to a planar image, or a planar image is mapped to a large-angle-of-view image, deformation of different degrees exists. Consequently, a correlation (or a spacing) between adjacent samples in the mapped-to image changes. In this case, if an existing image interpolation algorithm is used to perform image interpolation, image interpolation performance and efficiency are greatly reduced.

Figure 2:
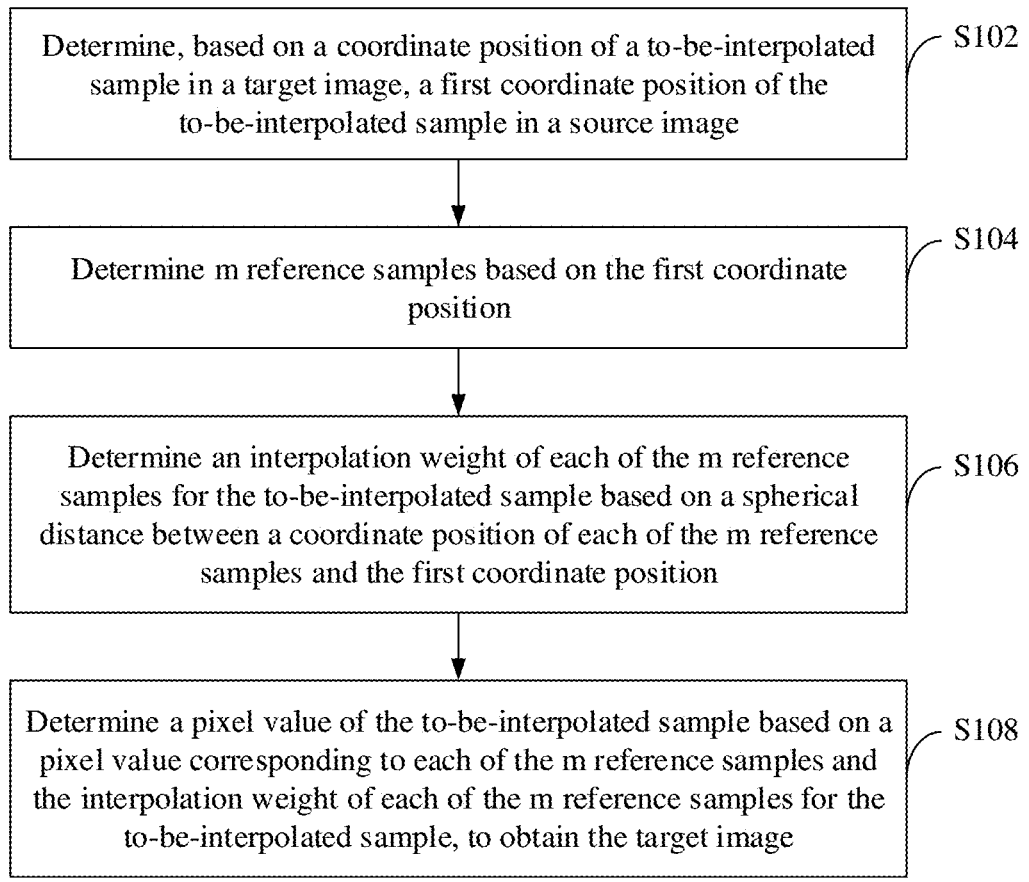
FIG. 2 is a schematic flowchart of an image processing method according to an embodiment of the present disclosure.

To resolve the foregoing problem, this application provides an image interpolation method and a terminal device applicable to the method. FIG. 2 is a schematic flowchart of an image interpolation method according to an embodiment of the present disclosure. The method shown in FIG. 2 includes the following implementation steps.

Step S102: A terminal device determines, based on a coordinate position of a to-be-interpolated sample in a target image, a first coordinate position of the to-be-interpolated sample in a source image, where the source image is a to-be-converted curved surface image or a planar image in a spherical image format, and the target image is an image obtained through conversion from the source image.

In this application, if an image is a curved surface image, a coordinate position of a sample in the image may be a coordinate position in a geographic coordinate system, that is, the coordinate position includes a longitude coordinate and a latitude coordinate, or if an image is a planar image in a spherical image format, a coordinate position of a sample in the image may be a coordinate position in a plane coordinate system, that is, the coordinate position includes a horizontal coordinate and a vertical coordinate. The spherical image format is described in detail below.

Step S104: The terminal device determines m reference samples based on the first coordinate position, where the m reference samples are located in the source image, and m is a positive integer.

The terminal device may select, from the source image, the m reference samples for the to-be-interpolated sample based on the first coordinate position of the to-be-interpolated sample in the source image. The reference samples are used to subsequently calculate a pixel value of the to-be-interpolated sample. Selection of the reference samples is described in detail below. Details are not described herein again.

Step S106: The terminal device determines an interpolation weight of each of the m reference samples for the to-be-interpolated sample based on a spherical distance between a coordinate position of each of the m reference samples and the first coordinate position.

Because a distance between a coordinate position of a reference sample and the first coordinate position is a spherical distance, a coordinate position used to calculate the spherical distance herein needs to be a coordinate position in a geographic coordinate system. Further, the coordinate position in the geographic coordinate system may be used to calculate spherical distances of the two coordinate positions in the longitude direction and the latitude direction. Details are described below.

Step S108: The terminal device determines a pixel value of the to-be-interpolated sample based on a pixel value corresponding to each of the m reference samples and the interpolation weight of each of the m reference samples for the to-be-interpolated sample, to obtain the target image. After calculating the pixel value of the to-be-interpolated sample, the terminal device may repeatedly perform steps S106 to S108 to calculate a pixel value of each to-be-interpolated sample in the target image in order to obtain the target image.

The following describes some specific embodiments and optional embodiments in this application. In step S102, for any sample (that is, the to-be-interpolated sample) in a to-be-generated target image, the first coordinate position of the to-be-interpolated sample in the source image may be determined based on the coordinate position of the to-be-interpolated sample in the target image. The source image is a to-be-converted curved surface image or a to-be-converted planar image in a spherical image format. The target image is an image generated after the source image is converted. The following describes several specific implementations in step S102.

In some implementations, when the coordinate position of the to-be-interpolated sample in the target image is a coordinate position of a point including a horizontal coordinate and a vertical coordinate in a plane coordinate system, the terminal device may map the coordinate position of the to-be-interpolated sample in the target image to the source image based on a preset image mapping relationship in order to obtain the first coordinate position of the to-be-interpolated sample in the source image.

The image mapping relationship is a position mapping relationship between the target image and the source image, that is, an association relationship between a position of the same point in the source image and the position of the same point in the target image.

Further, the terminal device may directly calculate, based on the coordinate position of the to-be-interpolated sample in the target image and the image mapping relationship, the coordinate position of the to-be-interpolated sample in the source image. In this case, the image mapping relationship herein may be a position mapping relationship between the plane coordinate system of the target image and a plane coordinate system of the source image, or may be a position mapping relationship between the plane coordinate system of the target image and a geographic coordinate system of the source image. Details are not described in this application. If the image mapping relationship is a position mapping relationship between the plane coordinate system of the target image and a plane coordinate system of the source image, the calculated first coordinate position is a coordinate position in the plane coordinate system. Correspondingly, the source image and the target image may be planar images in a spherical image format. If the image mapping relationship is a position mapping relationship between the plane coordinate system of the target image and a geographic coordinate system of the source image, the calculated first coordinate position is a coordinate position in the geographic coordinate system. Correspondingly, the source image is a curved surface image, and the target image is a planar image in a spherical image format.

Alternatively, the terminal device may first convert the coordinate position, in the planar coordinate system, of the to-be-interpolated sample in the target image into a coordinate position in a geographic coordinate system based on a preset first coordinate mapping relationship. Further, the coordinate position, in the geographic coordinate system, of the to-be-interpolated sample in the target image is mapped to the source image based on the preset image mapping relationship in order to obtain the first coordinate position of the to-be-interpolated sample in the source image.

Similarly, the image mapping relationship herein may be a position relationship between a geographic coordinate system of the target image and the plane coordinate system of the source image, or may be a position relationship between a geographic coordinate system of the target image and a geographic coordinate system of the source image. If the image mapping relationship is a position relationship between a geographic coordinate system of the target image and the plane coordinate system of the source image, the corresponding calculated first coordinate position is a coordinate position in the plane coordinate system. Correspondingly, the source image and the target image may be planar images in a spherical image format. If the image mapping relationship is a position mapping relationship between a geographic coordinate system of the target image and a geographic coordinate system of the source image, the corresponding calculated first coordinate position is a coordinate position in the geographic coordinate system. Correspondingly, the source image is a curved surface image, and the target image is a planar image in a spherical image format.

The first coordinate mapping relationship is a position mapping relationship between a plane coordinate system and a geographic coordinate system, that is, an association relationship between the same point in the plane coordinate system and the same point in the geographic coordinate system. The association relationship may be customized and set on a user side or a system side. Details are not described in this application. Both the first coordinate mapping relationship and the image mapping relationship may be represented using a corresponding mapping function. For example, a mapping function corresponding to the first coordinate mapping relationship may be f1, and a mapping function corresponding to the image mapping relationship may be f2. Details are not described in this application.

In some other implementations, when the coordinate position of the to-be-interpolated sample in the target image is a coordinate position of a point including a longitude coordinate and a latitude coordinate in a geographic coordinate system, the terminal device may map the coordinate position of the to-be-interpolated sample in the target image to the source image based on a preset image mapping relationship in order to obtain the first coordinate position of the to-be-interpolated sample in the source image.

The terminal device may directly calculate, based on the coordinate position of the to-be-interpolated sample in the target image and the image mapping relationship, the first coordinate position of the to-be-interpolated sample in the source image. The image mapping relationship herein may be a mapping relationship between the geographic coordinate system of the target image and a plane coordinate system of the source image. In this case, the corresponding calculated first coordinate position is a coordinate position in the plane coordinate system. Correspondingly, the source image may be a planar image in a spherical image format, and the target image is a curved surface image. The image mapping relationship herein may alternatively be a mapping relationship between the geographic coordinate system of the target image and a geographic coordinate system of the source image. In this case, the corresponding calculated first coordinate position is a coordinate position in the geographic coordinate system. Both the source image and the target image may be a curved surface image.

Alternatively, the terminal device may first convert the coordinate position, in the geographic coordinate system, of the to-be-interpolated sample in the target image into a coordinate position in a plane coordinate system based on a preset second coordinate mapping relationship. Further, the coordinate position, in the planar coordinate system, of the to-be-interpolated sample in the target image is correspondingly mapped to the source image based on the preset image mapping relationship in order to obtain the first coordinate position of the to-be-interpolated sample in the source image.

Similarly, the image mapping relationship herein may be a position mapping relationship between a plane coordinate system of the target image and the plane coordinate system of the source image. In this case, the corresponding calculated first coordinate position is a coordinate position in the plane coordinate system. The source image may be a planar image in a spherical image format, and the target image is a curved surface image. Further, the image mapping relationship herein may alternatively be a mapping relationship between a plane coordinate system of the target image and a geographic coordinate system of the source image. In this case, the corresponding calculated first coordinate position is a coordinate position in the geographic coordinate system. Both the source image and the target image may be a curved surface image.

The second coordinate mapping relationship is a position mapping relationship between the geographic coordinate system and the plane coordinate system, that is, an association relationship between coordinate positions of the same point in the geographic coordinate system and the plane coordinate system. Details are not described in this application. The first mapping relationship is a mapping relationship existing between the coordinate position in the plane coordinate system and the coordinate position in the geographic coordinate system, and the second mapping relationship is a mapping relationship existing between the coordinate position in the geographic coordinate system and the coordinate position in the plane coordinate system. Details are not described herein.

In an optional embodiment, because the spherical distances between the coordinate positions need to be calculated in step S106, corresponding coordinate positions need to be spherical coordinates, that is, coordinate positions in the geographic coordinate system. If the calculated first coordinate position is the coordinate position in the plane coordinate system, the terminal device may further correspondingly convert the first coordinate position in the plane coordinate system into a coordinate position in the geographic coordinate system based on the preset second coordinate mapping relationship in order to facilitate calculation in S106.

In an optional embodiment, an image resolution corresponding to the source image may be different from an image resolution corresponding to the target image. Optionally, the resolution of the target image is higher than the resolution of the source image. The image interpolation may be used to restore lost information in an image in a process of generating a high-resolution image from a low-resolution image. An algorithm used in an image interpolation process is referred to as an image interpolation algorithm in this application. Details are described below.

In an optional embodiment, the spherical image format corresponding to the source image may be different from the spherical image format corresponding to target image. Further, when both the source image and the target image are images in a spherical image format, the spherical image format corresponding to the source image may be different from the spherical image format corresponding to target image. The image interpolation in this application is applicable to conversion of images in different spherical image formats. That is, the image interpolation algorithm is used to perform image interpolation on a source image (to be specific, a sample in the source image) in a first spherical image format in order to generate/obtain a target image in a second spherical image format. The first spherical image format is different from the second spherical image format.

The spherical image format may be a format in which a device stores or transmits an image. The spherical image format may include but is not limited to equirectangular projection (ERP), cube map projection (CMP), Craster parabolic projection (CPP), adjusted CMP (ACP), compact octahedron projection (COHP), compact icosahedral projection (LISP), and other spherical image formats, and is not limited in this application.

In step S104, the terminal device may select the m reference samples around the first coordinate position in order to subsequently calculate information (for example, a pixel value) about the to-be-interpolated sample based on related information (for example, coordinate positions and pixel value) of the m reference samples. All of the m reference samples are located in the source image. Further, there are the following implementations.

In some implementations, the terminal device may obtain the m reference samples through sampling in a longitude direction and/or a latitude direction around the first coordinate position. Vertical coordinates or latitude coordinates of some of the m reference samples are the same, and/or horizontal coordinates or longitude coordinates of some of the m reference samples are the same. However, the m reference samples include no samples whose coordinate positions are exactly the same. If there are samples with a same coordinate position, it is considered that the samples are repeatedly sampled, and the samples may be considered as one reference sample.

Further, when the first coordinate position is a coordinate position in a geographic coordinate system (or the source image is a curved surface image), the terminal device may perform uniform sampling directly in a longitude direction and/or a latitude direction around the first coordinate position, to obtain the m reference samples. Alternatively, when the first coordinate position is a coordinate position in a plane coordinate system (or the source image is a planar image in a spherical image format), the terminal device first needs to determine a longitude direction and/or a latitude direction based on a position mapping relationship between a coordinate system (which may be a geographic coordinate system or a plane coordinate system) of the target image and a plane coordinate system of the source image. Further, the terminal device performs uniform sampling in the longitude direction and/or the latitude direction around the first coordinate position to obtain the m reference samples.

All the m reference samples are samples in the source image. In the longitude direction, latitude coordinates (that is, latitude values) corresponding to coordinate positions of the source image remain unchanged. Correspondingly, in the latitude direction, longitude coordinates (that is, longitude values) corresponding to coordinate positions of the source image remain unchanged.

For example, the terminal device may perform uniform sampling in the longitude direction and the latitude direction based on the first coordinate position, to obtain a×b (that is, m) reference samples. For example, a reference samples may be first obtained through uniform sampling in the longitude direction, and then b reference samples are obtained through uniform sampling in the latitude direction for each of the a reference samples. That is, the a reference samples are uniformly distributed in the longitude direction, and latitude coordinates (latitude values) corresponding to the a reference samples are the same. The b reference samples are also uniformly distributed in the latitude direction, and longitude coordinates (longitude values) corresponding to the b reference samples are the same.

Figure 3A:
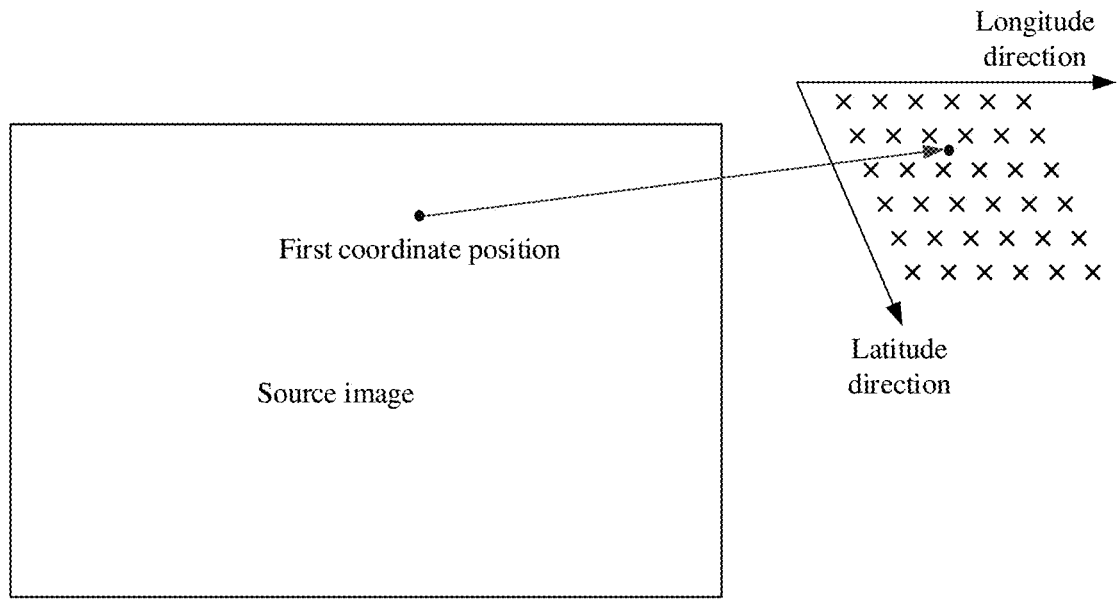
FIG. 3A and FIG. 3B are two schematic diagrams of reference samples according to embodiments of the present disclosure.

In an optional embodiment, in an image conversion process, a color of a sample is represented by both luminance and chrominance. Therefore, when a reference sample is selected for the to-be-interpolated sample, two dimensions, luminance and chrominance, may be considered. For a luminance component of an image, the selecting a reference sample from the source image may be selecting, as reference samples, a1×b1 closest samples around the first coordinate position in the longitude direction and the latitude direction. Further, FIG. 3A shows 6×6 closest reference samples selected for the to-be-interpolated sample, that is, a1=b1=6. As shown in FIG. 3A, in the longitude direction, latitude coordinates corresponding to all rows of reference samples are the same, and in the latitude direction, longitude coordinates corresponding to all columns of reference samples are the same.

Figure 3B:
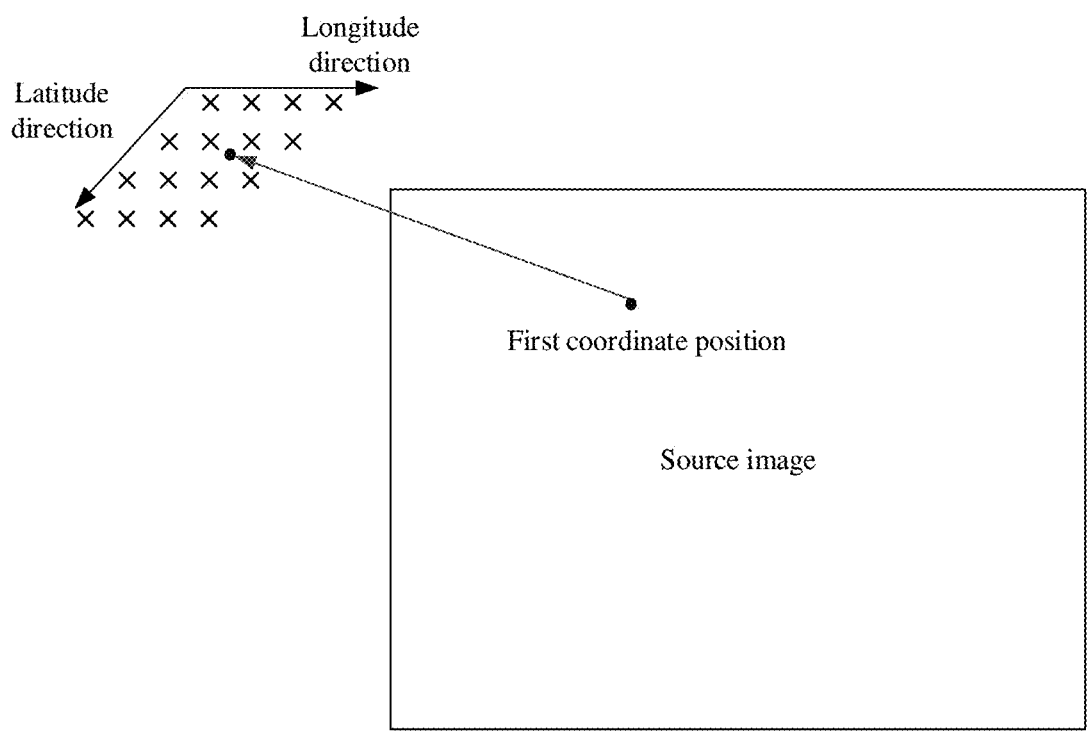

For a chrominance component of the image, the selecting a reference sample from the source image may be selecting, as reference samples, a2×b2 closest samples around the first coordinate position in the longitude direction and the latitude direction. a1, a2, b1, and b2 may be constants that are self-defined on a user side or a system side, and may be the same or may be different. This is not limited in this application. Further, FIG. 3B shows 4×4 closest reference samples selected for the to-be-interpolated sample, that is, a2=b2=4.

In some other implementations, the terminal device may select a corresponding reference pixel region around the first coordinate position, and the first coordinate position is located in the reference pixel region. Further, m reference samples are selected from the reference pixel region, that is, the reference pixel region includes the m reference samples. The m reference samples are used to subsequently generate the to-be-interpolated samples in the target image.

Further, there are the following possible implementations for selecting the reference pixel region.

In a possible implementation, the terminal device may select, as the reference pixel region, a region including a×b samples around the first coordinate position. a×b=m, and both a and b are positive integers. For example, the terminal device selects, using the first coordinate position as a center, a closest specified region as the reference pixel region. The specified region may be customized and set on a user side or on a system side, and features such as a size and a shape of the specified region are not limited. For example, the specified region may be a circle formed using the to-be-interpolated sample as a center and using a specified length as a radius.

Figure 4A:
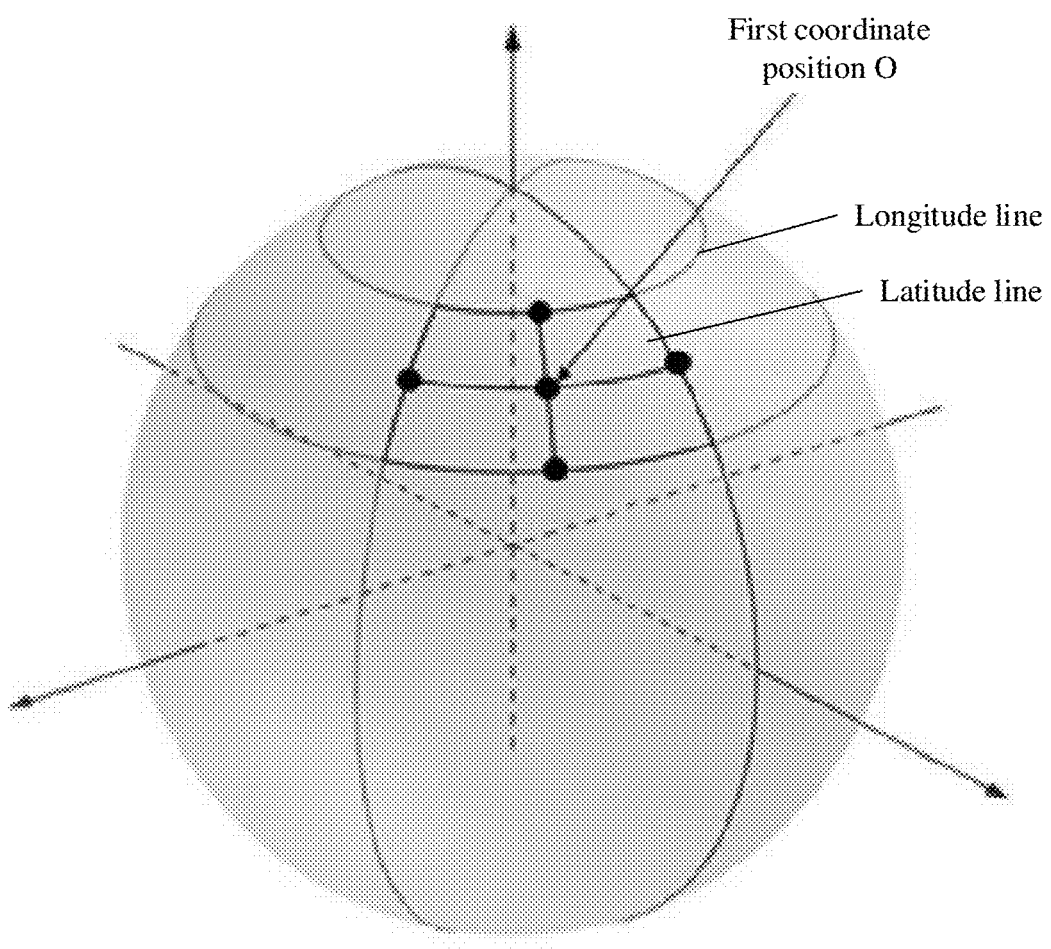
FIG. 4A and FIG. 4B are two schematic diagrams of a reference pixel region according to embodiments of the present disclosure.

In another possible implementation, the terminal device may select, around the first coordinate position as the reference pixel region, a region formed by intersecting two longitude lines and two latitude lines. FIG. 4A is a schematic diagram of selection of a reference pixel region. In FIG. 4A, a region formed by intersecting two longitude lines and two latitude lines is selected as a reference pixel region using the first coordinate position as a center.

Figure 4B:
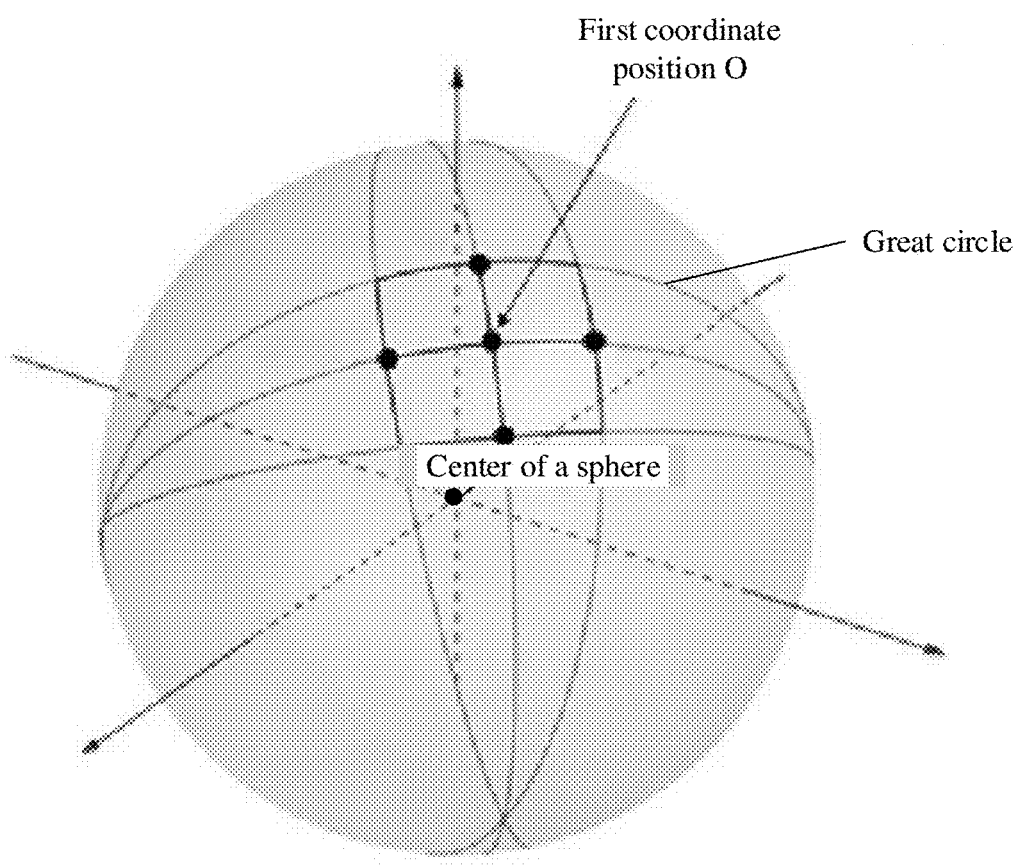

In another possible implementation, the terminal device may select, around the first coordinate position as the reference pixel region, a region formed by intersecting two groups of great circles. Each group of great circles includes two great circles, and all great circles in the two groups of great circles pass through a same sphere center. FIG. 4B is another schematic diagram of selection of a reference pixel region. In FIG. 4B, a region formed by intersecting four great circles passing through a same sphere center is selected as the reference pixel region using the first coordinate position as a center. Alternatively, a region formed by intersecting four great circles passing through a same sphere center is randomly selected around the first coordinate position as the reference pixel region or the like.

Correspondingly, after the terminal device determines the reference pixel region, the terminal device may select the m (that is, a×b) reference samples from the reference pixel region, to subsequently calculate the information (such as the pixel value) about the to-be-interpolated sample based on the related information (such as the coordinate positions and the pixel values) of these reference samples.

Further, the terminal device may perform uniform sampling in the reference pixel region based on the first coordinate position of the to-be-interpolated sample in the source image, to obtain the m reference samples. For how to obtain the m reference samples through sampling, refer to related descriptions in the foregoing embodiments. Details are not described herein again.

It should be noted that the terminal device alternatively selects/determines the m reference samples for the to-be-interpolated sample in the following implementation. The terminal device may select n samples around the to-be-interpolated sample based on the coordinate position of the to-be-interpolated sample in the target image. The n samples are located in the target image, and n is a positive integer greater than or equal to m. Further, coordinate positions of the n samples in the source image are determined based on coordinate positions of the n samples in the target image. Then, the m reference samples are determined based on coordinate positions of samples, corresponding to the n reference samples, in the source image.

Further, a selection manner in which the terminal device selects the n samples around the to-be-interpolated sample is not limited in this application. For example, the terminal device may randomly select n samples around the to-be-interpolated sample, or perform uniform sampling around the to-be-interpolated sample based on a fixed step length to obtain the n samples. For example, if the coordinate position of the to-be-interpolated sample is (x, y), a coordinate position of a selected sample may be (x+$k_0\Delta x$, y+$k_0\Delta y$). $k_0$ is a customized value, for example, +1, −1, +2, or −2. $\Delta x$ is an increment in a direction x (or a fixed step length during sampling). $\Delta y$ is an increment in a direction y (or a fixed step length during sampling).

Correspondingly, the terminal device may map coordinate positions of the n samples in the target image to the source image based on the preset image mapping relationship in order to obtain the coordinate positions of the n samples in the source image. Further, the terminal device may select, according to a specified rule, the m reference samples from the samples of the n samples in the source image. The preset condition may be customized and set on a user side or on a system side. For example, the terminal device may perform a function setting operation on the coordinate positions of the n samples in the source image, for example, a floor function operation for rounding up or a ceil function operation for rounding down in order to correspondingly obtain the m reference samples and the coordinate positions of the m reference samples in the source image.

For example, it is assumed that a coordinate position, in the source image, of a specific sample in the n samples is ($x_1$, $y_1$). After the rounding-up operation is performed on ($x_1$, $y_1$) using the floor function, one reference sample may be correspondingly obtained. A coordinate position of the reference sample is (floor($x_1$), floor($y_1$)).

In an optional embodiment, the reference sample in this application may be an integer sample. The to-be-interpolated sample may be a fractional sample, or may be an integer sample. For the integer sample and the fractional sample, refer to related descriptions in the foregoing embodiments. Details are not described herein again.

In step S106, the terminal device may determine the interpolation weight of each of the m reference samples for the to-be-interpolated sample based on the spherical distance between the coordinate position of each of the m reference samples and the first coordinate position.

Further, the terminal device may first determine a unit distance based on the coordinate position of each of the m reference samples, and then calculate the interpolation weight of each of the m reference samples for the to-be-interpolated sample based on the unit distance and the spherical distance between the coordinate position of each of the m reference samples and the first coordinate position. The unit distance and the interpolation weight of the reference sample for the to-be-interpolated sample are described in detail below in this application.

The unit distance includes a first unit distance and a second unit distance. The first unit distance is a distance between a first reference sample and a second reference sample in the longitude direction. The first reference sample and the second reference sample may be two reference samples, closest to the first coordinate position (which may be a longitude coordinate corresponding to the first coordinate position), in the m reference samples in the longitude direction. Optionally, a latitude coordinate corresponding to the first reference sample and a latitude coordinate corresponding to the second reference sample may be the same, or may be different. The second unit distance is a distance between a third reference sample and a fourth reference sample in the latitude direction. The third reference sample and the fourth reference sample may be two reference samples, closest to the first coordinate position (which may be a latitude coordinate corresponding to the first coordinate position), in the m reference samples in the latitude direction. Optionally, a longitude coordinate corresponding to the third reference sample and a longitude coordinate corresponding to the fourth reference sample may be the same, or may be different.

The first reference sample, the second reference sample, the third reference sample, and the fourth reference sample may be the same, or may be different, and are not limited in this application.

Spherical distances between a coordinate position of any one of the m reference samples and the first coordinate position include a first spherical distance and a second spherical distance. The first spherical distance is a spherical distance between the coordinate position of the any reference sample and the first coordinate position in the longitude direction. The second spherical distance is a spherical distance between the coordinate position of the any reference sample and the first coordinate position in the latitude direction.

In step S108, the terminal device may perform weighted summation on the m reference samples based on the pixel value corresponding to each of the m reference samples and an interpolation weight of each of the m reference samples for the to-be-interpolated sample, to calculate the pixel value of the to-be-interpolated sample. Further, the terminal device may calculate the pixel value of the to-be-interpolated sample based on formula (1):

$$P_o = \Sigma_{j=1}^{b} \Sigma_{i=1}^{a} L(\phi_{ij}, \lambda_{ij}) \times P_{ij}. \quad (1)$$

$P_o$ is the pixel value of the to-be-interpolated sample. $P_{ij}$ is a pixel value of any reference sample (for example, a target reference sample) in the m reference samples. $L(\phi_{ij}, \lambda_{ij})$ is an interpolation weight of the any reference sample (the target reference sample) for the to-be-interpolated sample. a is a quantity of reference samples obtained through sampling in the longitude direction. b is a quantity of reference samples obtained through sampling in the latitude direction. a×b=m, and a, b, and m are all positive integers.

Figure 5:
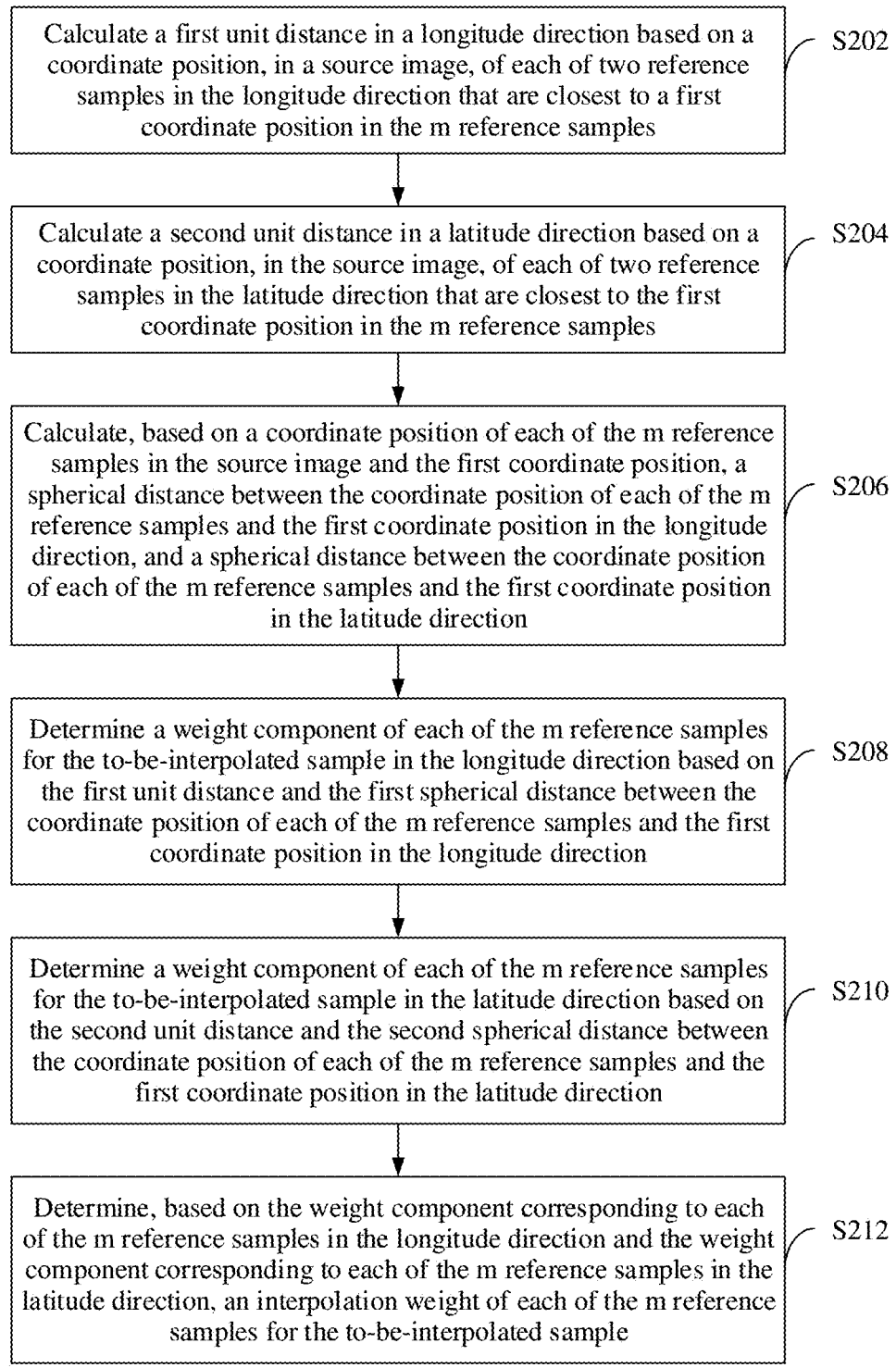
FIG. 5 is a schematic flowchart of another image processing method according to an embodiment of the present disclosure.

In some embodiments, the following describes a related embodiment in which the interpolation weight of each of the m reference samples for the to-be-interpolated sample is determined in S106. Further, as shown in FIG. 5, the method includes the following steps.

Step S202: The terminal device calculates a first unit distance in a longitude direction based on a coordinate position, in the source image, of each of two reference samples in the longitude direction that are closest to the first coordinate position in the m reference samples.

Further, in the longitude direction, two reference samples A and B that are closest to the to-be-interpolated sample may be first selected from the m reference samples, that is, the first sample and the second sample that are described above. Then the first unit distance is calculated based on coordinate positions of the reference samples A and B.

Figure 6A:
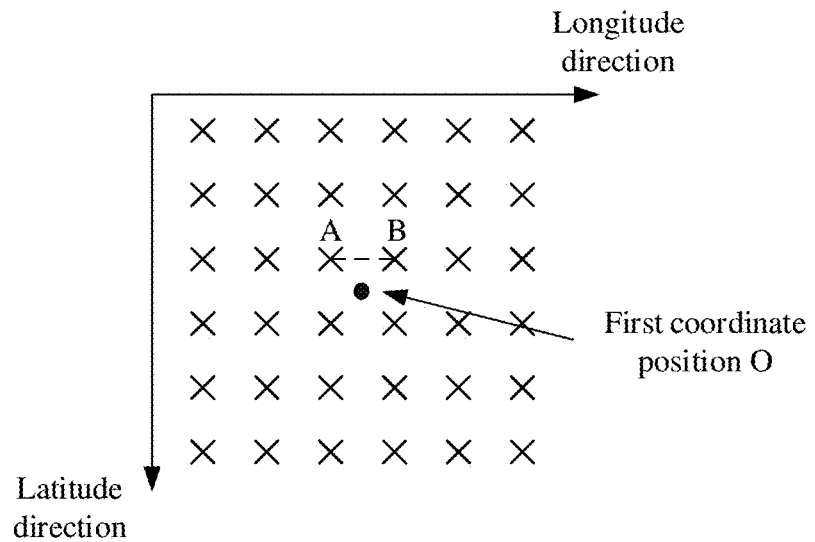
FIG. 6A and FIG. 6B are other two schematic diagrams of reference samples according to embodiments of the present disclosure.

FIG. 6A is a schematic diagram of reference samples. In FIG. 6A, O is a first coordinate position of the to-be-interpolated sample in the source image, and A and B are two reference samples closest to the first coordinate position O in the longitude direction. A coordinate position of the reference sample A is $(\phi_A, \lambda_A)$, a coordinate position of the reference sample B is $(\phi_B, \lambda_B)$, and the first coordinate position is $(\phi, \lambda)$. The terminal device may calculate the first unit distance $Ud_\phi$ in the longitude direction based on formula (2):

$$Ud_\phi = |\phi_A - \phi_B| \cdot R \cos \lambda_A. \tag{2}$$

R is a radius of a sphere corresponding to the source image. On a unit sphere, R is usually equal to 1. $\phi$ is a longitude coordinate, and $\lambda$ is a latitude coordinate.

Step S204: The terminal device calculates a second unit distance in a latitude direction based on a coordinate position, in the source image, of each of two reference samples in the latitude direction that are closest to the first coordinate position in the m reference samples.

In the latitude direction, two reference samples C and D that are closest to the to-be-interpolated sample may be first selected from the m reference samples, that is, the third sample and the fourth sample that are described above. Then the second unit distance is calculated based on coordinate positions of the reference samples C and D.

Figure 6B:
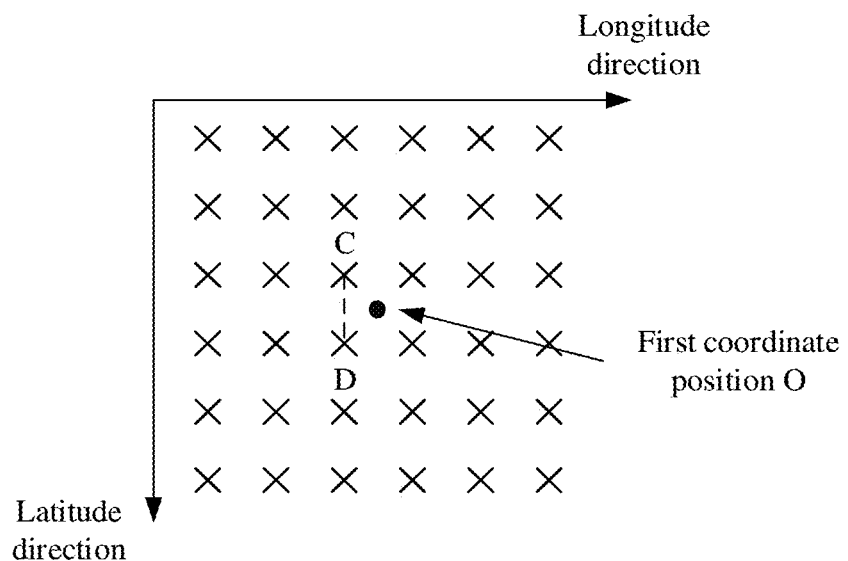

FIG. 6B is another schematic diagram of reference samples. In FIG. 6B, O is a first coordinate position of the to-be-interpolated sample in the source image, and C and D are two reference samples closest to the first coordinate position O in the latitude direction. A coordinate position of the reference sample C is $(\phi_C, \lambda_C)$, a coordinate position of the reference sample D is $(\phi_D, \lambda_D)$, and the first coordinate position is $(\phi, \lambda)$. The terminal device may calculate the second unit distance $Ud_\lambda$ in the latitude direction based on formula (3):

$$Ud_\lambda = |\lambda_C - \lambda_D| \cdot R. \tag{3}$$

Step S206: The terminal device calculates, based on a coordinate position of each of the m reference samples in the source image and the first coordinate position, a first spherical distance between the coordinate position of each of the m reference samples and the first coordinate position in the longitude direction and a second spherical distance between the coordinate position of each of the m reference samples and the first coordinate position in the latitude direction.

The terminal device calculates the spherical distance between the coordinate position of each of the m reference samples and the first coordinate position in the longitude direction, and the spherical distance between the coordinate position of each of the m reference samples and the first coordinate position in the latitude direction. That is, the spherical distance may include the first spherical distance in the longitude direction and the second spherical distance in the latitude direction. Details are described below.

Step S208: The terminal device determines a first weight component of each of the m reference samples for the to-be-interpolated sample based on the first unit distance and the first spherical distance between the coordinate position of each of the m reference samples and the first coordinate position.

The image interpolation algorithm may be customized and set on a user side or on a system side. The image interpolation algorithm may include but is not limited to a Lanczos interpolation algorithm, a bilinear interpolation algorithm, a cubic convolution interpolation algorithm, a nearest-neighbor interpolation algorithm, a piecewise linear interpolation algorithm, another interpolation algorithm, or the like, and is not limited in this application.

Step S210: The terminal device determines a second weight component of each of the m reference samples for the to-be-interpolated sample based on the second unit distance and the second spherical distance between the coordinate position of each of the m reference samples and the first coordinate position.

Step S212: The terminal device determines, based on the first weight component of each of the m reference samples for the to-be-interpolated sample and the second weight component of each of the m reference samples for the to-be-interpolated sample, an interpolation weight of each of the m reference samples for the to-be-interpolated sample.

In this application, specific implementations of step S206 to step S212 are described below using a target reference sample as an example. The target reference sample is any one of the m reference samples. A coordinate position of the target reference sample in the source image (that is, a coordinate position of the target reference sample) is $(\phi_{ij}, \lambda_{ij})$, and the first coordinate position is $(\phi, \lambda)$.

In step S206, the terminal device may calculate, based on formula (4), the first spherical distance $d_{\phi_{ij}}$ between the coordinate position of the target reference sample and the first coordinate position in the longitude direction, and the second spherical distance $d_{\lambda_{ij}}$ between the coordinate position of the target reference sample and the first coordinate position in the latitude direction:

$$d_{\phi_{ij}} = |\phi - \phi_{ij}| \cdot R \cos \lambda, \text{ and}$$

$$d_{\lambda_{ij}} = |\lambda - \lambda_{ij}| \cdot R. \tag{4}$$

In step S208, the terminal device may calculate the first weight component $L_{\phi_{ij}}$ of the target reference sample for the to-be-interpolated sample in the longitude direction based on the first unit distance $Ud_\phi$ and the first spherical distance $d_{\phi_{ij}}$ and with reference to the image interpolation algorithm $\delta$. For example, $L_{\phi_{ij}}$ may be calculated based on formula (5):

$$L_{\phi_{ij}} = \delta\left(\frac{d_{\phi_{ij}}}{Ud_{\phi_{ij}}}\right). \tag{5}$$

In step S210, the terminal device may calculate the second weight component $L_{\lambda_{ij}}$ of the target reference sample for the to-be-interpolated sample in the latitude direction based on the second unit distance $Ud_\lambda$ and the second spherical distance $d_{\lambda_{ij}}$ and with reference to the image interpolation algorithm $\delta$. For example, $L_{\lambda_{ij}}$ may be calculated based on formula (6):

$$L_{\lambda_{ij}} = \delta\left(\frac{d_{\lambda_{ij}}}{Ud_{\lambda_{ij}}}\right). \tag{6}$$

In step S212, the terminal device can calculate the interpolation weight $L(\phi_{ij}, \lambda_{ij})$ of the target reference sample for the to-be-interpolated sample based on the first weight component $L_{\phi_{ij}}$ of the target reference sample for the to-be-interpolated sample in the longitude direction and the second weight component $L_{\lambda_{ij}}$ of the target reference sample for the to-be-interpolated sample in the latitude direction.

Further, the terminal device can process the first weight component $L_{\phi_{ij}}$ and the second weight component $L_{\lambda_{ij}}$ according to a specified operation rule, to obtain the corresponding interpolation weight. The specified operation rule is an operation rule customized and set on a user side or a system side, for example, addition or multiplication. For example, a multiplication operation is used as an example. In this case, the terminal device can calculate $L(\phi_{ij}, \lambda_{ij})$ based on formula (7):

$$L(\phi_{ij},\lambda_{ij})=L_{\phi_{ij}}\times L_{\lambda_{ij}}. \tag{7}$$

Implementing the embodiments of the present disclosure can resolve a problem in the other approaches that image interpolation performance and efficiency are reduced when a planar image interpolation algorithm is used to perform image processing on a non-planar image (a curved surface image), thereby effectively improving non-planar image interpolation performance and efficiency.

For ease of understanding, related specific embodiments corresponding to the image interpolation method are described in detail below using examples in this application.

In a first embodiment, a source image in a CPP format is converted into a target image in an ERP format.

Figure 7:
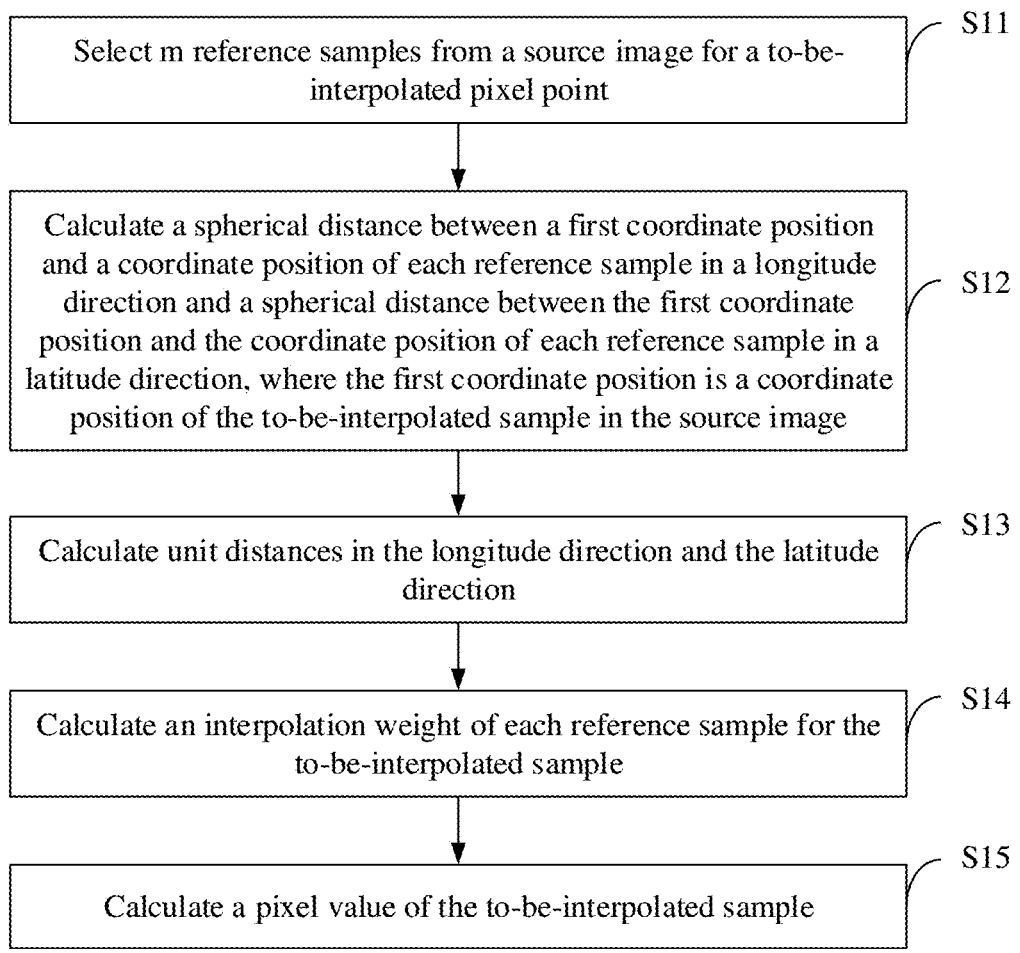
FIG. 7 is a schematic flowchart of another image processing method according to an embodiment of the present disclosure.

In this embodiment, referring to FIG. 7, the image interpolation method includes the following implementation steps.

S11: Select m reference samples from a source image for any to-be-interpolated sample in a target image.

In this embodiment, a coordinate position of the to-be-interpolated sample in the target image is ($m_0$, $n_0$), and may be a coordinate position in a geographic coordinate system, or may be a coordinate position in a plane coordinate system. It is assumed that ($m_0$, $n_0$) herein is a coordinate position in a plane coordinate system, $m_0$ is a horizontal coordinate, and $n_0$ is a vertical coordinate.

The terminal device may convert ($m_0$, $n_0$) into a coordinate position ($\phi_{ij}$, $\lambda_1$) in a geographic coordinate system based on a preset coordinate mapping relationship. That is, a coordinate position of the to-be-interpolated sample in the target image is represented using geographical coordinates ($\phi_1$, $\lambda_1$). For example, formula (8) shows the geographic coordinate position of the to-be-interpolated sample in the target image:

$$\begin{cases} \phi_1 = \left(\frac{(m_0+\varepsilon)}{W_1} - \frac{1}{2}\right) \cdot 2\pi \\ \lambda_1 = \left(\frac{1}{2} - \frac{(n_0+\varepsilon)}{H_1}\right) \cdot \pi \end{cases} \tag{8}$$

$W_1$ is a width of the target image. $H_1$ is a height of the target image. $\phi_1$ is a longitude coordinate and has a value range $[-\pi, \pi]$. $\lambda_1$ is a latitude coordinate and has a value range $[-\pi/2, \pi/2]$. $\varepsilon$ is a customized constant that represents a coordinate offset and has a value range $[0, 1)$. $\varepsilon$ is usually 0 or 0.5.

Then, the terminal device maps the to-be-interpolated sample ($\phi_1$, $\lambda_1$) in the target image to a coordinate position in the source image based on a preset image mapping relationship, that is, a first coordinate position (x, y) of the to-be-interpolated sample in the source image. The image mapping relationship herein is a position mapping relationship between the target image in the ERP format and the source image in the CPP format, that is, an association relationship between the same point in the target image in the ERP format and the same point in the source image in the CPP format. The first coordinate position may be a coordinate position in the geographic coordinate system, or may be a coordinate position in the plane coordinate system. It is assumed that the first coordinate position herein is a coordinate position in the plane coordinate system, x is a horizontal coordinate, and y is a vertical coordinate. For example, formula (9) shows the first coordinate position (x, y) of the to-be-interpolated sample ($\phi_1$, $\lambda_1$) in the source image:

$$\begin{cases} x = \left[\pi + \phi_1\left(2\cos\frac{2\lambda_1}{3} - 1\right)\right] \cdot \frac{W}{2\pi} \\ y = H\sin\frac{\lambda_1}{3} + \frac{H}{2} \end{cases} \tag{9}$$

H is a height of the source image. W is a width of the source image.

Further, the terminal device may perform uniform sampling in a longitude direction and/or a latitude direction around the first coordinate position, to obtain the m reference samples selected for the to-be-interpolated sample.

Further, the terminal device may transform formula (9) to obtain formula (10):

$$x = \frac{W}{2} + \frac{W}{2\pi} \times \phi_1 \times \left[1 - 4 \times \left(\frac{1}{2} - \frac{y}{H}\right)^2\right]. \tag{10}$$

In this embodiment, it is set that W=2H.

From formula (9), it can be learned that the vertical coordinate y of the first coordinate position is related to the latitude coordinate $\lambda_1$. Therefore, in this example, the terminal device may calculate the latitude direction based on a position mapping relationship between the geographic coordinate system and the plane coordinate system of the source image. Further, the terminal device calculates a derivative of y to x based on the position mapping relationship shown in formula (10), to obtain the latitude direction. That is, a slope direction passing through the to-be-interpolated sample ($\phi_1$, $\lambda_1$) is calculated as the latitude direction. Further, formula (11) shows a latitude direction calculation formula:

$$\frac{dy}{dx} = \frac{1}{\frac{8}{\pi} \times \phi_1 \times \left(\frac{1}{2} - \frac{y}{H}\right)}, \text{ and} \tag{11}$$

$$y = C, 0 \le C \le H.$$

C is a constant.

Further, the terminal device performs uniform sampling around the first coordinate position in the slope direction (the latitude direction) to obtain the corresponding m reference samples. Further, formula (12) shows a coordinate position ($x_{ij}$, $y_{ij}$) of a reference sample obtained through uniform sampling.

$$\begin{aligned} y_{ij} &= \text{floor}(y) + \Delta y_i \\ x_{ij} &= \text{round}(x + dx_i) + \Delta x_j \\ &= \text{round}\left(x + dy_i \times \frac{8}{\pi} \cdot \phi_1\left(\frac{1}{2} - \frac{y}{H}\right)\right) + \Delta x_j \\ &= \text{round}\left(x + |y - y_{ij}| \times \frac{8}{\pi} \cdot \phi_1\left(\frac{1}{2} - \frac{y}{H}\right)\right) + \Delta x_j \end{aligned} \tag{12}$$

$dx_i$ represents an offset of a central horizontal coordinate of reference samples in an $i^{th}$ row relative to the horizontal coordinate of the to-be-interpolated sample, $dy_i$ represents an offset of a vertical coordinate of the reference samples in the $i^{th}$ row relative to the vertical coordinate of the to-be-interpolated sample, $\Delta y_i$ represents an increment in a direction of the vertical coordinate, $\Delta x_j$ represents an increment in a direction of the horizontal coordinate, $i \in (1, 2, 3, \ldots a)$, $j \in (1, 2, 3 \ldots b)$, and $a \times b = m$.

Generally, for an image luminance component, $a=b=6$, and $\Delta y_i \in (-2, -1, 0, 1, 2, 3)$, $\Delta x_j \in (-2, -1, 0, 1, 2, 3)$. For an image chrominance component, $a=b=4$, $\Delta y_i \in (-1, 0, 1, 2)$, and $\Delta x_j \in (-1, 0, 1, 2)$. The floor function is used for rounding down. Optionally, the floor function in this embodiment of this application may alternatively be replaced by a ceil function, and the ceil function is used for rounding up. The round function is used for rounding, that is, obtaining a most approximate integer.

S12: Calculate a spherical distance between a first coordinate position and a coordinate position of each reference sample in a longitude direction and a spherical distance between the first coordinate position and the coordinate position of each reference sample in a latitude direction, where the first coordinate position is a coordinate position of the to-be-interpolated sample in the source image.

Further, because distances between coordinate positions in the longitude direction and the latitude direction in this application are spherical distances, the coordinate positions used to calculate the spherical distances need to be coordinate positions in a geographic coordinate system. When the first coordinate position or the coordinate position of the reference sample is a coordinate position in a plane coordinate system, the first coordinate position or the coordinate position of the reference sample needs to be correspondingly converted into a coordinate position in the geographic coordinate system, and then a spherical distance between the first coordinate position and the coordinate position of the reference sample in the longitude direction and a spherical distance between the first coordinate position and the coordinate position of the reference sample in the latitude direction are calculated.

In this embodiment, the terminal device may convert the first coordinate position (x, y) into a coordinate position ($\phi$, $\lambda$) in the geographic coordinate system based on the preset coordinate mapping relationship. Further, formula (13) shows a coordinate position, in the geographic coordinate system, of the first coordinate position (x, y) in formula (9):

$$\begin{cases} \phi = \dfrac{\dfrac{2\pi x}{W} - \pi}{2\cos\dfrac{2\lambda}{3} - 1} \\ \lambda = 3\arcsin\left(\dfrac{y}{H} - \dfrac{1}{2}\right) \end{cases} \quad (13)$$

Correspondingly, the terminal device may convert the reference sample $(x_{ij}, y_{ij})$ in the source image into the coordinate position $(\phi_{ij}, \lambda_{ij})$ in the geographic coordinate system based on the preset coordinate mapping relationship. The coordinate position is shown in formula (14):

$$\begin{cases} \phi_{ij} = \dfrac{\dfrac{2\pi x_{ij}}{W} - \pi}{2\cos\dfrac{2\lambda_{ij}}{3} - 1} \\ \lambda_{ij} = 3\arcsin\left(\dfrac{y_{ij}}{H} - \dfrac{1}{2}\right) \end{cases} \quad (14)$$

Further, the terminal device may calculate, based on the coordinate position ($\phi_{ij}$, $\lambda_{ij}$) of the reference sample in the ground coordinate system and the first coordinate position ($\phi$, $\lambda$), a first spherical distance $d_{\phi_{ij}}$ between the coordinate position ($\phi_{ij}$, $\lambda_{ij}$) of the reference sample in the ground coordinate system and the first coordinate position ($\phi$, $\lambda$) in the longitude direction and a second spherical distance $d_{\lambda_{ij}}$ between the coordinate position ($\phi_{ij}$, $\lambda_{ij}$) of the reference sample in the ground coordinate system and the first coordinate position ($\phi$, $\lambda$) in the latitude direction. Further, the first spherical distance $d_{\phi_{ij}}$ and the second spherical distance $d_{\lambda_{ij}}$ may be shown in formula (15):

$$d_{\phi_{ij}} = |\phi - \phi_{ij}| \cdot R \cos \lambda, \text{ and}$$

$$d_{\lambda_{ij}} = |\lambda - \lambda_{ij}| \cdot R. \quad (15)$$

S13: Calculate unit distances in the longitude direction and the latitude direction.

The terminal device may select, from the m reference samples in the longitude direction, two reference samples A and B that are closest to the first coordinate position. Further, a difference between longitude coordinates of the two reference samples is calculated, and is used as a first unit distance $Ud_\phi$ in the longitude direction.

Correspondingly, two reference samples C and D that are closest to the first coordinate position are selected from the m reference samples in the latitude direction. Further, a difference between latitude coordinates of the two reference samples is calculated, and is used as a second unit distance $Ud_\lambda$ in the latitude direction. Further, the first unit distance $Ud_\phi$ and the second unit distance $Ud_\lambda$ may be shown in formula (16):

$$Ud_\phi = |\phi_A - \phi_B| \cdot R \cos \lambda_A, \text{ and}$$

$$Ud_\lambda = |\lambda_C - \lambda_D| \cdot R. \quad (16)$$

A coordinate position of the reference sample A is ($\phi_A$, $\lambda_A$), a coordinate position of the reference sample B is ($\phi_B$, $\lambda_B$), a coordinate position of the reference sample C is ($\phi_C$, $\lambda_C$), a coordinate position of the reference sample D is ($\phi_D$, $\lambda_D$), $\phi$ is the longitude coordinate, and $\lambda$ is the latitude coordinate.

Figure 8A:
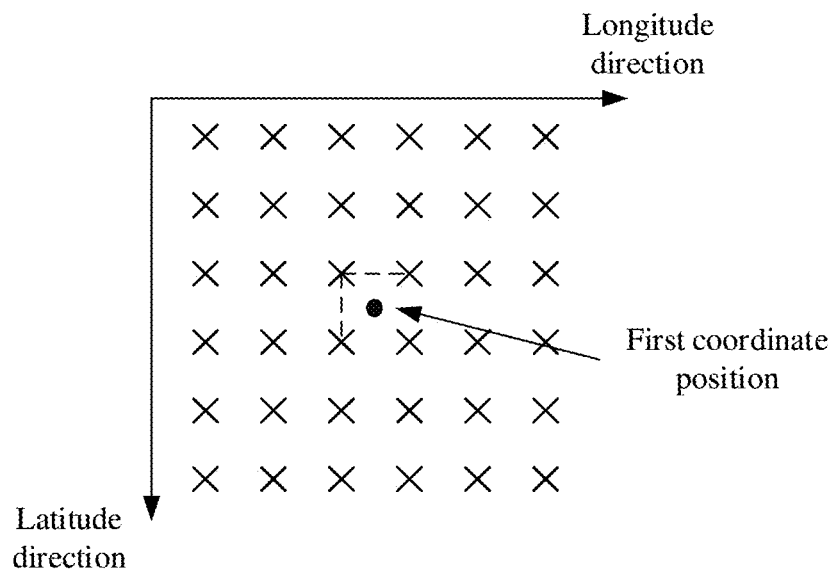
FIG. 8A and FIG. 8B are other two schematic diagrams of reference samples according to embodiments of the present disclosure.
Figure 8B:
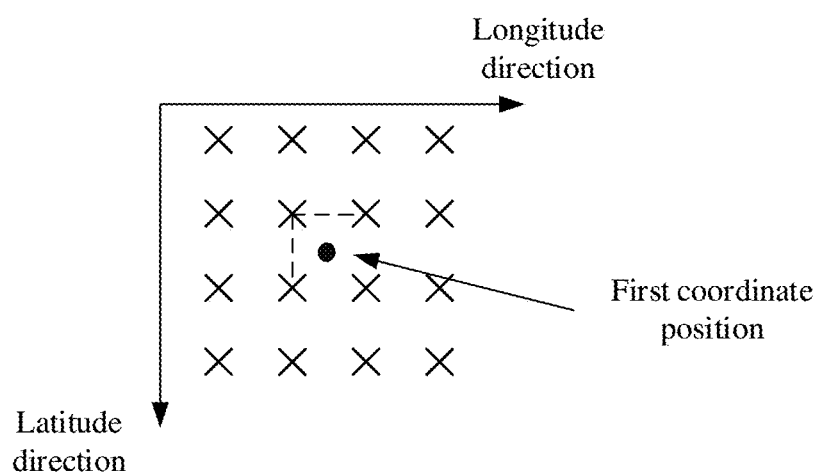

For example, FIG. 8A and FIG. 8B show 6×6 reference samples correspondingly selected for an image luminance component and 4×4 reference samples correspondingly selected for an image chrominance component. As shown in FIG. 8A, two reference samples that are closest to the first coordinate position O in the longitude direction are a sample in a third row and a third column and a sample in the third row and a fourth column, and two reference samples closest to the first coordinate position O in the latitude direction are a sample in a third row and a third column and a sample in a fourth row and the third column. In this case, the first unit distance $Ud_\phi$ in the longitude direction and the second unit distance $Ud_\lambda$ in the latitude direction that are shown in FIG. 8A are shown in formula (17):

$$Ud_\phi = |\phi_{33} - \phi_{34}| \cdot R \cos \lambda_3, \text{ and}$$

$$Ud_\lambda = |\lambda_3 - \lambda_4| \cdot R. \quad (17)$$

Correspondingly, as shown in FIG. 8B, two reference samples closest to the first coordinate position O in the longitude direction are a sample in a second row and a second column and a sample in the second row and a third column, and two reference samples closest to the first coordinate position O in the latitude direction are a sample in a second row and a second column and a sample in a third row and the second column. The first unit distance $Ud_\phi$ in the longitude direction and the second unit distance $Ud_\lambda$ in the latitude direction that are shown in FIG. 8B are shown in formula (18):

$$Ud_\phi = |\phi_{22} - \phi_{23}| \cdot R \cos \lambda_2, \text{ and}$$

$$Ud_\lambda = |\lambda_2 - \lambda_3| \cdot R. \tag{18}$$

S14: Calculate an interpolation weight of each reference sample for the to-be-interpolated sample.

The terminal device may calculate, based on an image interpolation algorithm, the calculated first unit distance in the longitude direction, and the calculated first spherical distance in the longitude direction, a first weight component $L_{\phi_{ij}}$ of each reference sample for the to-be-interpolated sample in the longitude direction. Correspondingly, the terminal device may calculate, based on an image interpolation algorithm, the calculated second unit distance in the latitude direction, and the calculated second spherical distance in the latitude direction, a second weight component $L_{\lambda_{ij}}$ of each reference sample for the to-be-interpolated sample in the latitude direction.

For example, the image interpolation algorithm is a Lanczos algorithm. Formulas (19) and (20) show a weight component of a reference sample $(\phi_{ij}, \lambda_{ij})$ for a to-be-interpolated sample $(\phi, \lambda)$ in the longitude direction and a weight component of the reference sample $(\phi_{ij}, \lambda_{ij})$ for the to-be-interpolated sample $(\phi, \lambda)$ in the latitude direction, respectively:

$$L_{\phi_{ij}} = \begin{cases} 1 & \text{if } \dfrac{d_{\phi_{ij}}}{Ud_\phi} = 0, \\ \dfrac{c_1 \sin\left(\pi \dfrac{d_{\phi_{ij}}}{Ud_\phi}\right) \sin\left(\dfrac{\pi \dfrac{d_{\phi_{ij}}}{Ud_\phi}}{c_1}\right)}{\pi^2 \left(\dfrac{d_{\phi_{ij}}}{Ud_\phi}\right)^2} & \text{if } -c_1 \le \dfrac{d_{\phi_{ij}}}{Ud_\phi} \le c_1 \text{ and } \dfrac{d_{\phi_{ij}}}{Ud_\phi} \ne 0, \\ 0 & \text{otherwise} \end{cases} \tag{19}$$

$$L_{\lambda_{ij}} = \begin{cases} 1 & \text{if } \dfrac{d_{\lambda_{ij}}}{Ud_\lambda} = 0, \\ \dfrac{c_2 \sin\left(\pi \dfrac{d_{\lambda_{ij}}}{Ud_\lambda}\right) \sin\left(\dfrac{\pi \dfrac{d_{\lambda_{ij}}}{Ud_\lambda}}{c_2}\right)}{\pi^2 \left(\dfrac{d_{\lambda_{ij}}}{Ud_\lambda}\right)^2} & \text{if } -c_2 \le \dfrac{d_{\lambda_{ij}}}{Ud_\lambda} \le c_2 \text{ and } \dfrac{d_{\lambda_{ij}}}{Ud_\lambda} \ne 0, \\ 0 & \text{otherwise} \end{cases} \tag{20}$$

$c_1$ and $c_2$ are half-window sizes used when sampling is performed for the reference sample, $$c_1 = \frac{a}{2} \text{ and } c_2 = \frac{b}{2}.$$

When sampling is performed based on an image luminance component, $c_1 = c_2 = 3$. When sampling is performed based on an image chrominance component of, $c_1 = c_2 = 2$.

Further, after the weight components ($L_{\phi_{ij}}$ and $L_{\lambda_{ij}}$) of the reference sample for the to-be-interpolated sample in the longitude direction and the latitude direction are obtained, interpolation weights (that is, two-dimensional interpolation weights) $L(\phi_{ij}, \lambda_{ij})$ of the reference sample for the to-be-interpolated sample may be calculated. For example, formula (21) shows a calculation formula of $L(\phi_{ij}, \lambda_{ij})$:

$$L(\phi_{ij}, \lambda_{ij}) = L_{\phi_{ij}} \times L_{\lambda_{ij}}. \tag{21}$$

S15: Calculate a pixel value of the to-be-interpolated sample.

The terminal device may calculate the pixel value of the to-be-interpolated sample based on a pixel value of each reference sample and an interpolation weight of each reference sample for the to-be-interpolated sample. Further, the first unit distance and the second unit distance may be shown in formula (22):

$$P_o = \sum_{j=1}^{b} \sum_{i=1}^{a} L(\phi_{ij}, \lambda_{ij}) \times P_{ij}. \tag{22}$$

In a second embodiment: A source image in a CMP format is converted into a target image in an ERP format.

In this embodiment, the image interpolation method may include the following implementation steps.

S21: Select m reference samples from a source image for any to-be-interpolated sample in a target image.

In this embodiment, it is assumed that a coordinate position, in the geographic coordinate system, of the to-be-interpolated sample in the target image is $(\phi_1, \lambda_1)$. The terminal device may map the coordinate position of the to-be-interpolated sample in the target image to a coordinate position in the source image based on a preset image mapping relationship, that is, a first coordinate position of the to-be-interpolated sample in the source image. For example, formula (23) shows a first coordinate position (x, y) of a to-be-interpolated sample $(\phi_1, \lambda_1)$ in the source image:

$$\begin{cases} x = \dfrac{(\tan\phi_1 + 1)W}{2} \\ y = \dfrac{\left(1 - \dfrac{\tan\lambda_1}{\cos\phi_1}\right)H}{2} \end{cases} \tag{23}$$

H is a height of the source image. W is a width of the source image.

Further, the terminal device may perform uniform sampling in a longitude direction and/or a latitude direction around the first coordinate position, to obtain the m reference samples selected for the to-be-interpolated sample.

Further, the terminal device may transform formula (23) to obtain formula (24):

$$\left(1 - \frac{2y}{H}\right)^2 = (\tan\lambda_1)^2 \left[1 + \left(\frac{2x}{W} - 1\right)^2\right]. \tag{24}$$

In this embodiment, it is set that W=H.

From formula (23), it can be learned that a horizontal coordinate x of the first coordinate position is related to the latitude coordinate $\phi_1$. Therefore, in this example, the terminal device may calculate the longitude direction based on a position mapping relationship between a geographic coordinate system and a plane coordinate system of the source image. Further, the terminal device calculates a derivative of y to x based on the position mapping relationship shown in the formula (24), to obtain the longitude direction. That is, a slope direction passing through the to-be-interpolated sample $(\phi_1, \lambda_1)$ is calculated as the longitude direction. The slope calculation formula is shown in formula (25):

$$x = C, 0 \le C \le W, \text{ and} \tag{25}$$

$$\frac{dy}{dx} = \frac{\left(x - \frac{W}{2}\right) \times (\tan\lambda_1)^2}{2H - 4y}.$$

C is a constant.

Further, the terminal device performs uniform sampling around the first coordinate position in the slope direction (the longitude direction), to obtain the corresponding m reference samples. Further, formula (26) shows a coordinate position $(x_{ij}, y_{ij})$ of a reference sample obtained through uniform sampling.

$$x_{ij} = \text{floor}(x) + \Delta x_j, \text{ and} \tag{26}$$

$$\begin{aligned} y_{ij} &= \text{round}(y + dy_j) + \Delta y_i \\ &= \text{round}\left(y - dx_j \times \frac{\left(x - \frac{W}{2}\right) \times (\tan\lambda_1)^2}{2H - 4y}\right) + \Delta y_i \\ &= \text{round}\left(y - |x - x_{ij}| \times \frac{\left(x - \frac{W}{2}\right) \times (\tan\lambda_1)^2}{2H - 4y}\right) + \Delta y_i. \end{aligned}$$

For related parameters in formula (26), refer to related descriptions of formula (12). Details are not described herein again.

S22: Calculate a spherical distance between the first coordinate position and a coordinate position of each reference sample in the longitude direction, and a spherical distance between the first coordinate position and the coordinate position of each reference sample in the latitude direction, where the first coordinate position is the coordinate position of the to-be-interpolated sample in the source image.

In this embodiment, the terminal device may convert a first coordinate position (x, y) into a coordinate position ($\phi$, $\lambda$) in the geographic coordinate system based on a preset coordinate mapping relationship. That is, the coordinate position, corresponding to the first coordinate position, in the geographic coordinate system is ($\phi$, $\lambda$). Further, formula (27) shows the coordinate position, corresponding to the first coordinate position (x, y) in formula (23), in the geographic coordinate system:

$$\begin{cases} \phi = \arctan\left(\frac{2x}{W} - 1\right) \\ \lambda = \arctan\left(\left(1 - \frac{2y}{H}\right) \cdot \cos\phi\right) \end{cases} \tag{27}$$

Correspondingly, the terminal device may convert the reference sample $(x_{ij}, y_{ij})$ in the source image into the coordinate position $(\phi_{ij}, \lambda_{ij})$ in the geographic coordinate system based on the preset coordinate mapping relationship. The coordinate position $(\phi_{ij}, \lambda_{ij})$ is shown in formula (28):

$$\begin{cases} \phi_{ij} = \arctan\left(\frac{2x_{ij}}{W} - 1\right) \\ \lambda_{ij} = \arctan\left(\left(1 - \frac{2y_{ij}}{H}\right) \cdot \cos\phi_{ij}\right) \end{cases} \tag{28}$$

Further, the terminal device may calculate, based on a reference sample ($\phi_{ij}$, $\lambda_{ij}$) in the ground coordinate system and the first coordinate position ($\phi$, $\lambda$), a first spherical distance $d_{\phi_{ij}}$ between the reference sample ($\phi_{ij}$, $\lambda_{ij}$) in the ground coordinate system and the first coordinate position ($\phi$, $\lambda$) in the longitude direction and a second spherical distance $d_{\lambda_{ij}}$ between the reference sample ($\phi_{ij}$, $\lambda_{ij}$) in the ground coordinate system and the first coordinate position ($\phi$, $\lambda$) in the latitude direction.

S23: Calculate unit distances in the longitude direction and the latitude direction.

S24: Calculate an interpolation weight of each reference sample for the to-be-interpolated sample.

S25: Calculate a pixel value of the to-be-interpolated sample.

It should be noted that, for a part that is not shown or described in this embodiment of the present disclosure, correspondingly refer to the related descriptions in the first embodiment. For example, for details of steps S23 to S25, refer to the related descriptions in S13 to S15. Details are not described herein again.

In a third embodiment, a source image in a low-resolution ERP format is converted into a target image in a high-resolution ERP format.

In this embodiment, the image interpolation method may include the following implementation steps.

S31: Select m reference samples from a source image for any to-be-interpolated sample in a target image.

In this embodiment, a coordinate position of the to-be-interpolated sample in the target image is ($m_0$, $n_0$), and may be a coordinate position in a geographic coordinate system, or may be a coordinate position in a plane coordinate system. It is assumed that ($m_0$, $n_0$) herein is a coordinate position in a plane coordinate system, $m_0$ is a horizontal coordinate, and $n_0$ is a vertical coordinate.

The terminal device may convert ($m_0$, $n_0$) into a coordinate position ($\phi_1$, $\lambda_1$) in a geographic coordinate system based on a preset coordinate mapping relationship. That is, a coordinate position of the to-be-interpolated sample in the target image is represented using geographical coordinates ($\phi_1$, $\lambda_1$). For example, formula (29) shows the geographic coordinate position of the to-be-interpolated sample in the target image:

$$\begin{cases} \phi_1 = \left(\frac{(m_0 + \varepsilon)}{W_1} - \frac{1}{2}\right) \cdot 2\pi \\ \lambda_1 = \left(\frac{1}{2} - \frac{(n_0 + \varepsilon)}{H_1}\right) \cdot \pi \end{cases} \tag{29}$$

$W_1$ is a width of the target image. $H_1$ is a height of the target image. $\phi_1$ is a longitude coordinate and has a value range $[-\pi, \pi]$. $\lambda_1$ is a latitude coordinate and has a value range $[-\pi/2, \pi/2]$. $\varepsilon$ is a customized constant that represents a coordinate offset, and has a value range $[0, 1)$. $\varepsilon$ is usually 0 or 0.5.

Then, the terminal device maps the to-be-interpolated sample ($\phi_1$, $\lambda_1$) in the target image to a coordinate position in the source image based on a preset image mapping relationship, that is, a first coordinate position (x, y) of the to-be-interpolated sample in the source image. The first coordinate position may be a coordinate position in the geographic coordinate system, or may be a coordinate position in the plane coordinate system. It is assumed that the first coordinate position herein is a coordinate position in the plane coordinate system, x is a horizontal coordinate, and y is a vertical coordinate. For example, formula (30) shows the coordinate position (x, y) of the to-be-interpolated sample ($\phi_1$, $\lambda_1$) in the source image:

$$\begin{cases} x = \left(\dfrac{\phi_1}{2\pi} + \dfrac{1}{2}\right) \cdot W - \varepsilon \\ y = \left(\dfrac{1}{2} - \dfrac{\lambda_1}{\pi}\right) \cdot H - \varepsilon \end{cases} \quad (30)$$

H is a height of the source image. W is a width of the source image.

Further, the terminal device may perform uniform sampling in a longitude direction and/or a latitude direction around the first coordinate position, to obtain the m reference samples selected for the to-be-interpolated sample.

Figure 9:
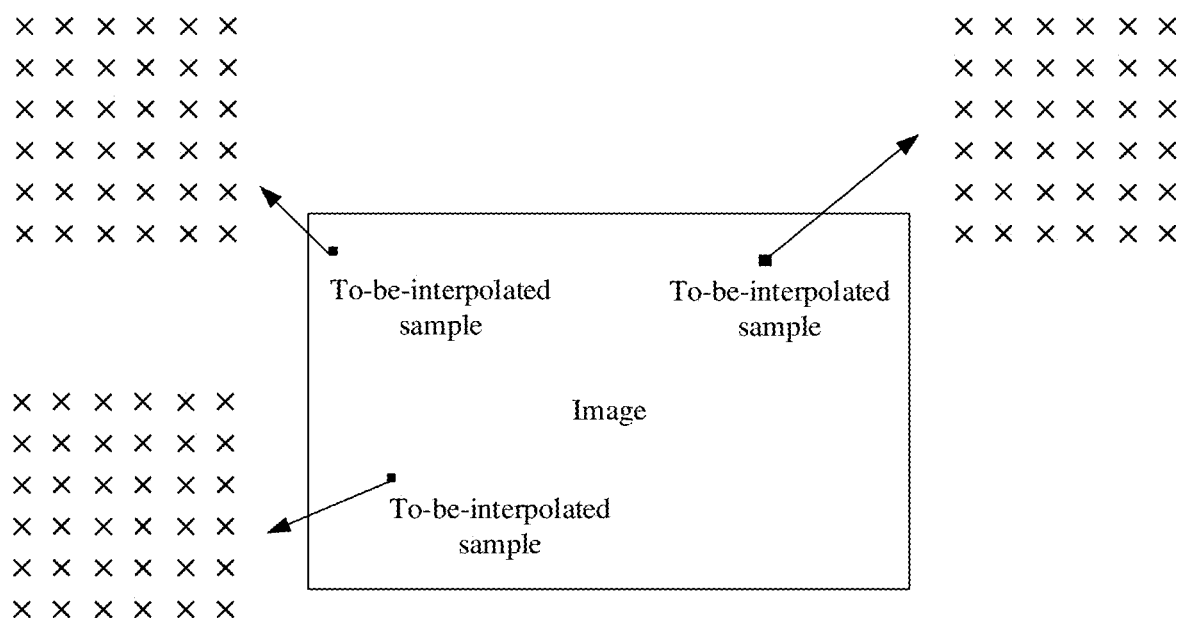
FIG. 9 is a schematic diagram of another reference sample according to an embodiment of the present disclosure.

In this embodiment, both the source image and the target image are images in a same spherical image format (ERP). Therefore, when sampling is performed for a reference sample, uniform sampling may be directly performed in a horizontal direction (that is, the longitude direction) and a vertical direction (that is, the latitude direction) of a coordinate system, to obtain the m reference samples. For example, as shown in FIG. 9, for an image luminance component, 6×6 reference samples are obtained through uniform sampling.

Further, formula (31) may show a coordinate position ($x_{ij}$, $y_{ij}$) of a reference sample obtained through uniform sampling:

$$x_{ij} = \text{floor}(x) + \Delta x_j, \text{ and}$$

$$y_{ij} = \text{floor}(y) + \Delta y_i. \quad (31)$$

For parameters in formula (31), refer to related descriptions of formula (12). Details are not described herein again.

S32: Calculate a spherical distance between the first coordinate position and a coordinate position of each reference sample in the longitude direction, and a spherical distance between the first coordinate position and the coordinate position of each reference sample in the latitude direction, where the first coordinate position is a coordinate position of the to-be-interpolated sample in the source image.

In this embodiment, the terminal device may convert the first coordinate position (x, y) in the plane coordinate system into a coordinate position ($\phi$, $\lambda$) in the geographic coordinate system based on the preset coordinate mapping relationship. That is, the coordinate position, corresponding to the first coordinate position, in the geographic coordinate system is ($\phi$, $\lambda$). Further, formula (32) shows the coordinate position, corresponding to the first coordinate position (x, y) in formula (30), in the geographic coordinate system:

$$\begin{cases} \phi = \left(\dfrac{(x+\varepsilon)}{W_1} - \dfrac{1}{2}\right) \cdot 2\pi \\ \lambda = \left(\dfrac{1}{2} - \dfrac{(y+\varepsilon)}{H_1}\right) \cdot \pi \end{cases} \quad (32)$$

Correspondingly, the terminal device may convert a reference sample ($x_{ij}$, $y_{ij}$) in the source image into the coordinate position ($\phi_{ij}$, $\lambda_{ij}$) in the geographic coordinate system based on the preset coordinate mapping relationship. The coordinate position ($\phi_{ij}$, $\lambda_{ij}$) is shown in formula (33):

$$\begin{cases} \phi_{ij} = \left(\dfrac{(x_{ij}+\varepsilon)}{W} - \dfrac{1}{2}\right) \cdot 2\pi \\ \lambda_{ij} = \left(\dfrac{1}{2} - \dfrac{(y_{ij}+\varepsilon)}{W}\right) \cdot \pi \end{cases} \quad (33)$$

Further, the terminal device may calculate, based on the coordinate position ($\phi_{ij}$, $\lambda_{ij}$) of the reference sample in the ground coordinate system and the first coordinate position ($\phi$, $\lambda$), a first spherical distance $d_{\phi_{ij}}$ between the coordinate position ($\phi_{ij}$, $\lambda_{ij}$) of the reference sample in the ground coordinate system and the first coordinate position ($\phi$, $\lambda$) in the longitude direction and a second spherical distance $d_{\lambda_{ij}}$ between the coordinate position ($\phi_{ij}$, $\lambda_{ij}$) of the reference sample in the ground coordinate system and the first coordinate position ($\phi$, $\lambda$) in the latitude direction.

S33: Calculate unit distances in the longitude direction and the latitude direction.

S34: Calculate an interpolation weight of each reference sample for the to-be-interpolated sample.

S35: Calculate a pixel value of the to-be-interpolated sample.

It should be noted that, for a part that is not shown or described in this embodiment, correspondingly refer to the related descriptions in the first embodiment. For example, for details of steps S33 to S35, refer to the related descriptions in S13 to S15. Details are not described herein again.

In a fourth embodiment, a source image in a CCP format is converted into a target image in an ERP format based on a bilinear interpolation algorithm.

In this embodiment, the image interpolation method may include the following implementation steps.

S41: Select m reference samples from a source image for any to-be-interpolated sample in a target image.

For some specific image interpolation algorithms, reference samples correspondingly selected based on the image interpolation algorithms are usually default samples. For example, for a bilinear interpolation algorithm, 2×2 samples around the first coordinate position are usually selected as reference samples. For a cubic convolution interpolation algorithm, 4×4 samples around the first coordinate position are usually selected as reference samples. The first coordinate position is a coordinate position of the to-be-interpolated sample in the source image.

Figure 10A:
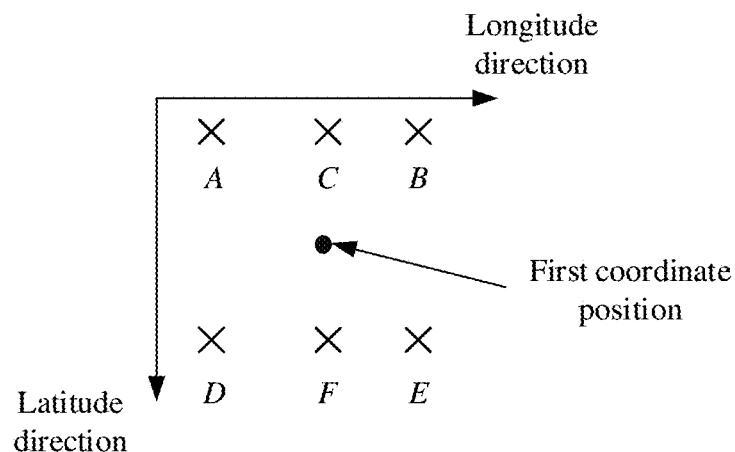
FIG. 10A and FIG. 10B are other two schematic diagrams of reference samples according to embodiments of the present disclosure.

In this embodiment, the bilinear interpolation algorithm is used as an example. FIG. 10A is a schematic diagram of selection of reference samples. As shown in FIG. 10A, 2×2 samples are selected around the first coordinate position as reference samples ($\phi_{ij}$, $\lambda_{ij}$), to be specific, samples A, B, D, and E in the figure, where i=1, 2, and j=1, 2.

S42: Calculate a spherical distance between the first coordinate position and a coordinate position of each reference sample in a longitude direction, and a spherical distance between the first coordinate position and the coordinate position of each reference sample in a latitude direction, where the first coordinate position is a coordinate position of the to-be-interpolated sample in the source image.

S43: Calculate unit distances in the longitude direction and the latitude direction.

S44: Calculate an interpolation weight of each reference sample for the to-be-interpolated sample.

Referring to the example in FIG. 10A, the terminal device may obtain a sample C through weighting based on the reference samples A and B. A longitude coordinate of the sample C is the same as a longitude coordinate of the first coordinate position, and a latitude coordinate of the sample C is the same as a latitude coordinate of the sample A/B. Similarly, a sample F may be obtained through weighting based on the reference samples D and E. A longitude coordinate of the sample F is the same as a longitude coordinate of the first coordinate position, and a latitude coordinate of the sample F is the same as a latitude coordinate of the sample D/E.

Correspondingly, the terminal device may calculate interpolation weights of the reference samples A, B, D, and E for the to-be-interpolated sample in the longitude direction. Further, the interpolation weights are shown in formula (34):

$$L_A = \frac{\phi_B - \phi_C}{\phi_B - \phi_A},$$

$$L_B = \frac{\phi_C - \phi_A}{\phi_B - \phi_A},$$

$$L_D = \frac{\phi_E - \phi_F}{\phi_E - \phi_D}, \text{ and}$$

$$L_E = \frac{\phi_F - \phi_D}{\phi_E - \phi_D}.$$

(34)

$L_k$ represents a weight component of a sample K for the to-be-interpolated sample. $\phi_k$ represents a longitude coordinate of the sample K. The K herein may be A, B, C, D, E, and F.

Further, the terminal device may calculate weight components of the samples A, B, D, and E for the to-be-interpolated sample in the latitude direction, that is, calculate interpolation weights of the samples C and F for the to-be-interpolated sample in the latitude direction. Further, the interpolation weights are shown in formula (35):

$$L_C = \frac{\lambda_o - \lambda_F}{\lambda_C - \lambda_F}, \text{ and}$$

$$L_F = \frac{\lambda_C - \lambda_o}{\lambda_C - \lambda_F}.$$

(35)

$\lambda_k$ represents a latitude coordinate of the sample K. The K herein is C, F, or a first coordinate position O.

S45: Calculate a pixel value of the to-be-interpolated sample.

Further, in this embodiment, the bilinear interpolation algorithm is used to calculate the pixel value of the to-be-interpolated sample. Further, the first unit distance and the second unit distance may be shown in formula (36):

$$P_o = L_C(L_A P_A + L_B P_B) + L_F(L_D P_D + L_E P_E). \quad (36)$$

It should be noted that, for content that is not shown or described in this embodiment, refer to the related descriptions in the first embodiment. Details are not described herein again.

In a fifth embodiment, a source image in a CCP format is converted into a target image in an ERP format based on a cubic convolution interpolation algorithm.

In this embodiment, the image interpolation method may include the following implementation steps.

S51: Select m reference samples from a source image for any to-be-interpolated sample in a target image.

For some specific image interpolation algorithms, reference samples correspondingly selected based on the image interpolation algorithm are usually default samples. For example, for a bilinear interpolation algorithm, 2×2 samples around the first coordinate position are usually selected as reference samples. For a cubic convolution interpolation algorithm, 4×4 samples around the first coordinate position are usually selected as reference samples. The first coordinate position is a coordinate position of the to-be-interpolated sample in the source image.

Figure 10B:
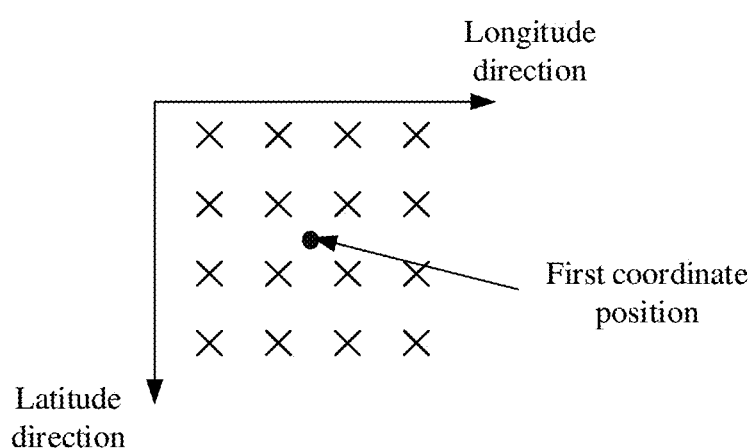

In this embodiment, a cubic convolution interpolation algorithm is used as an example. FIG. 10B is a schematic diagram of selection of reference samples. Further, 4×4 samples are selected around the first coordinate position as reference samples $(\phi_{ij}, \lambda_{ij})$ or $(x_{ij}, y_{ij})$, where i=1, 2, 3, 4, and j=1, 2, 3, 4.

S52: Calculate a spherical distance between the first coordinate position and a coordinate position of each reference sample in a longitude direction and a spherical distance between the first coordinate position and the coordinate position of each reference sample in a latitude direction, where the first coordinate position is a coordinate position of the to-be-interpolated sample in the source image.

S53: Calculate unit distances in the longitude direction and the latitude direction.

S54: Calculate an interpolation weight of each reference sample for the to-be-interpolated sample.

S55: Calculate a pixel value of the to-be-interpolated sample.

In S54, because the image interpolation algorithm used in this embodiment is a cubic convolution interpolation algorithm, the following provides an example of calculating, respectively, weight components ($L_{\phi_{ij}}$ and $L_{\lambda_{ij}}$ of the reference sample $(\phi_{ij}, \lambda_{ij})$ for the to-be-interpolated sample in the longitude direction and the latitude direction based on the cubic convolution interpolation algorithm. The weight components are shown in formulas (37) and (38):

$$L_{\phi_{ij}} = \begin{cases} 1 - (\alpha+3) \times \left|\frac{d_{\phi_{ij}}}{Ud_\phi}\right|^2 + (\alpha+2) \times \left|\frac{d_{\phi_{ij}}}{Ud_\phi}\right|^3, \left|\frac{d_{\phi_{ij}}}{Ud_\phi}\right| < 1 \\ -(4\alpha) + (8\alpha) \times \left|\frac{d_{\phi_{ij}}}{Ud_\phi}\right| - (5\alpha) \times \\ \left|\frac{d_{\phi_{ij}}}{Ud_\phi}\right|^2 + \alpha \left|\frac{d_{\phi_{ij}}}{Ud_\phi}\right|^3, 1 \leq \left|\frac{d_{\phi_{ij}}}{Ud_\phi}\right| \leq 2 \\ 0, \left|\frac{d_{\phi_{ij}}}{Ud_\phi}\right| \geq 2 \end{cases}, \quad (37)$$

$$L_{\lambda_{ij}} = \begin{cases} 1 - (\alpha+3) \times \left|\frac{d_{\lambda_{ij}}}{Ud_\lambda}\right|^2 + (\alpha+2) \times \left|\frac{d_{\lambda_{ij}}}{Ud_\lambda}\right|^3, \left|\frac{d_{\lambda_{ij}}}{Ud_\lambda}\right| < 1 \\ -(4\alpha) + (8\alpha) \times \left|\frac{d_{\lambda_{ij}}}{Ud_\lambda}\right| - (5\alpha) \times \\ \left|\frac{d_{\lambda_{ij}}}{Ud_\lambda}\right|^2 + \alpha \left|\frac{d_{\lambda_{ij}}}{Ud_\lambda}\right|^3, 1 \leq \left|\frac{d_{\lambda_{ij}}}{Ud_\lambda}\right| \leq 2 \\ 0, \left|\frac{d_{\lambda_{ij}}}{Ud_\lambda}\right| \geq 2 \end{cases}. \quad (38)$$

$\alpha$ is a parameter in the cubic convolution interpolation algorithm, and the parameter is a constant customized and set on a user side or a system side.

Correspondingly, the interpolation weight $L(\phi_{ij}, \lambda_{ij})$ of the reference sample for the to-be-interpolated sample may be calculated based on $L_{\phi_{ij}}$ and $L_{\lambda_{ij}}$. It should be noted that, for details of S41 to S45 in this application, refer to the related descriptions in the foregoing embodiments of S11 to S15. Details are not described herein again.

Implementing this embodiment of the present disclosure can resolve a problem in the other approaches that image interpolation performance and efficiency are reduced when a planar image interpolation algorithm is used to process a curved surface image, thereby effectively improving non-planar image interpolation performance and efficiency.

The foregoing mainly describes, from a perspective of the terminal device, the solutions provided in the embodiments of the present disclosure. It may be understood that, to implement the foregoing functions, the terminal device includes corresponding hardware structures and/or software modules for performing the functions. With reference to the units and algorithm steps described in the embodiments disclosed in the present disclosure, the embodiments of the present disclosure can be implemented in a form of hardware or hardware and computer software. Whether a specific function is performed by hardware or hardware driven by computer software depends on particular applications and design constraints of the technical solutions. A person skilled in the field may use different methods to implement the described functions for each particular application, but it should not be considered that the implementation falls beyond the scope of the technical solutions in the present disclosure.

In the embodiments of the present disclosure, the terminal device may be divided into functional units based on the foregoing method examples. For example, division into the functional units may be performed based on corresponding functions, or two or more functions may be integrated into one processing unit. The integrated unit may be implemented in a form of hardware, or may be implemented in a form of a software functional unit. It should be noted that, in this embodiment of the present disclosure, unit division is an example, and is merely logical function division. In actual implementation, another division manner may be used.

Figure 11A:
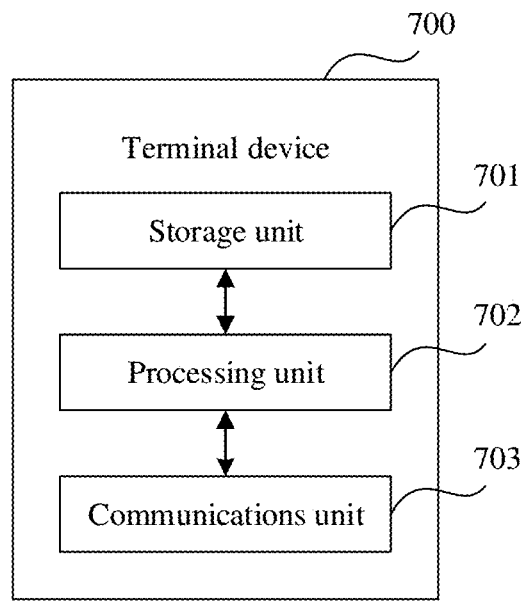
FIG. 11A and FIG. 11B are two schematic structural diagrams of a terminal device according to embodiments of the present disclosure.

When the integrated unit is used, FIG. 11A is a possible schematic structural diagram of the terminal device in the foregoing embodiments. The terminal device 700 includes a processing unit 702 and a communications unit 703. The processing unit 702 is configured to control and manage actions of the terminal device 700. For example, the processing unit 702 is configured to support a network device 700 in performing steps S102 to S108 in FIG. 2, steps S202 to S212 in FIG. 5, steps S11 to S15 in FIG. 7, and/or other steps performed to implement the technologies described in this specification. The communications unit 703 is configured to support the terminal device 700 in communicating with another device. For example, the communications unit 703 is configured to support the terminal device 700 in obtaining a source image from the network device, and/or performing other steps performed to implement the technologies described in this specification. Optionally, the terminal device 700 may further include a storage unit 701. The storage unit 701 is configured to store program code and data of the terminal device 700.

The processing unit 702 may be a processor or a controller, for example, a central processing unit (CPU), a general-purpose processor, a digital signal processor (DSP), an application-specific integrated circuit (ASIC), a field-programmable gate array (FPGA) or another programmable logical device, a transistor logical device, a hardware component, or any combination thereof. The processing unit 702 may implement or execute various example logical blocks, modules, and circuits described with reference to content disclosed in the present disclosure. The processor may alternatively be a combination of processors implementing a computing function, for example, a combination of one or more microprocessors, or a combination of a DSP and a microprocessor. The communications unit 703 may be a communications interface, a transceiver, a transceiver circuit, or the like. The communications interface is a general term, and may include one or more interfaces, for example, an interface between a network device and another device. The storage unit 701 may be a memory.

Optionally, the terminal device 700 may further include a display unit (not shown in the figure). The display unit may be configured to preview or display an image. For example, the display unit is used to display a target image, a source image, or the like. In actual application, the display unit may be a display, a player, or the like. This is not limited in this application.

Figure 11B:
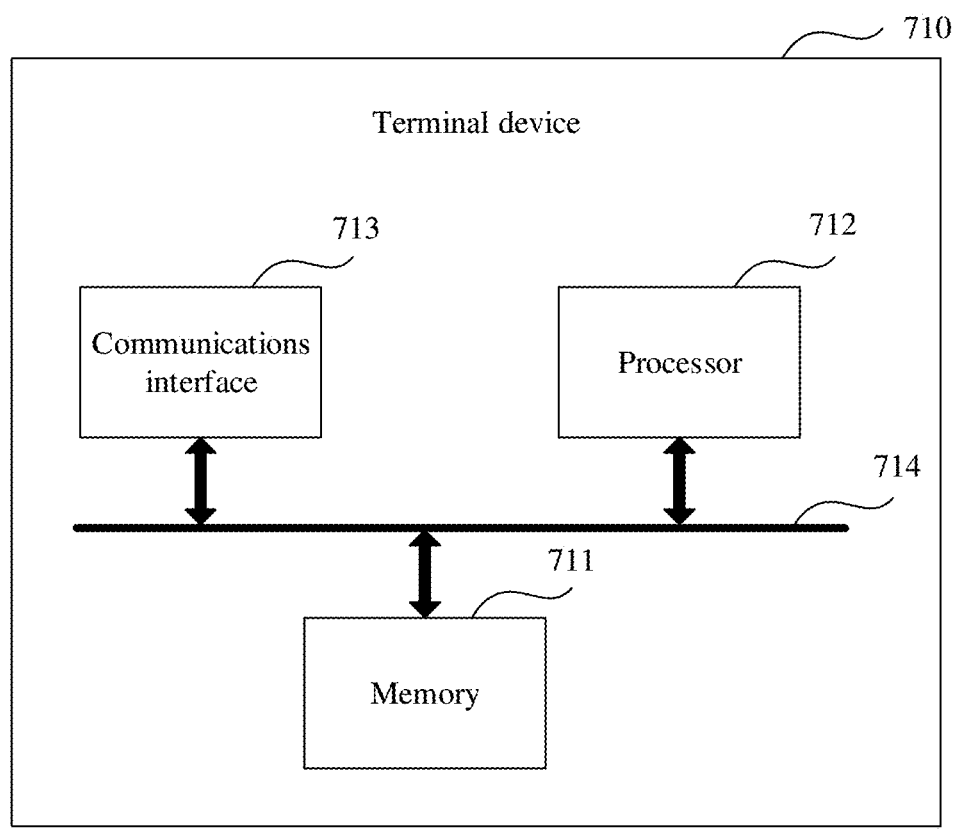

When the processing unit 702 is a processor, the communications unit 703 is a communications interface, and the storage unit 701 is a memory, the terminal device in this embodiment of the present disclosure may be the terminal device shown in FIG. 11B.

As shown in FIG. 11B, the terminal device 710 includes a processor 712, a communications interface 713, and a memory 771. Optionally, the terminal device 710 may further include a bus 714. The communications interface 713, the processor 712, and the memory 771 may be connected to each other using the bus 714. The bus 714 may be a Peripheral Component Interconnect (PCI) bus, an Extended Industry Standard Architecture (EISA) bus, or the like. The bus 714 may be classified into an address bus, a data bus, a control bus, and the like. For ease of representation, only one thick line is used for representation in FIG. 11B, but this does not mean that there is only one bus or only one type of bus.

For specific implementation of the terminal device shown in FIG. 11A or FIG. 11B, refer to corresponding descriptions in the foregoing method embodiments. Details are not described herein again.

Methods or algorithm steps described with reference to the content disclosed in the embodiments of the present disclosure may be implemented by hardware, or may be implemented by a processor by executing software instructions. The software instructions may include a corresponding software module. The software module may be stored in a random-access memory (RAM), a flash memory, a read-only memory (ROM), an erasable programmable ROM (EPROM), an electrically EPROM (EEPROM), a register, a hard disk, a mobile hard disk, a compact disc (CD) ROM (CD-ROM), or any other form of storage medium well known in the art. For example, a storage medium is coupled to a processor such that the processor can read information from the storage medium or write information into the storage medium. Certainly, the storage medium may be a component of the processor. The processor and the storage medium may be located in an ASIC. In addition, the ASIC may be located in a network device. Certainly, the processor and the storage medium may alternatively exist in a terminal device as discrete components.

A person of ordinary skill in the art may understand that all or some of the procedures of the methods in the embodiments may be implemented by a computer program instructing relevant hardware. The program may be stored in a computer readable storage medium. When the program is run, the procedures of the method embodiments may be performed. The foregoing storage medium includes any medium that can store program code, such as a ROM, a RAM, a magnetic disk, or an optical disc.

What is claimed is:

1. An image interpolation method comprising:
    determining, based on a first coordinate position of a to-be-interpolated sample in a target image, a second coordinate position of the to-be-interpolated sample in a source image, wherein the source image is a curved surface image or a planar image in a spherical image format;

determining m reference samples located in the source image based on the second coordinate position, wherein m is a positive integer;

determining an interpolation weight of each of the m reference samples for the to-be-interpolated sample based on a first spherical distance between a third coordinate position of each of the m reference samples and the second coordinate position; and determining a first pixel value of the to-be-interpolated sample based on a second pixel value corresponding to each of the m reference samples and the interpolation weight of each of the m reference samples to obtain the target image.

2. The image interpolation method of claim 1, wherein the source image is the planar image, and wherein either spherical image formats corresponding to the source image and the target image are different or image resolutions corresponding to the source image and the target image are different.

3. The image interpolation method of claim 1, further comprising obtaining the m reference samples by sampling around the second coordinate position along a longitude direction or a latitude direction, wherein vertical coordinates or latitude coordinates of a first part of the m reference samples are the same or wherein horizontal coordinates or longitude coordinates of a second part of the m reference samples are the same.

4. The image interpolation method of claim 3, wherein the source image is the planar image, wherein the second coordinate position is of a point consisting of a horizontal coordinate and a vertical coordinate in a planar coordinate system, and wherein the image interpolation method further comprises:

determining the longitude direction based on a first position mapping relationship between a geographic coordinate system and the planar coordinate system, wherein latitude values corresponding to second coordinate positions of the source image in the longitude direction remain unchanged; and determining the latitude direction based on a second position mapping relationship between the geographic coordinate system and the planar coordinate system, wherein longitude values corresponding to the second coordinate positions in the latitude direction remain unchanged.

5. The image interpolation method of claim 1, wherein the first spherical distance of each of the m reference samples comprises a second spherical distance and a third spherical distance, wherein the second spherical distance is between the third coordinate position and the second coordinate position in a longitude direction, wherein the third spherical distance is between the third coordinate position and the second coordinate position in a latitude direction, and wherein the image interpolation method further comprises:

determining a first unit distance comprising a second unit distance and a third unit distance, wherein the second unit distance is between a first reference sample and a second reference sample in the longitude direction, wherein the first reference sample and the second reference sample are two reference samples in the m reference samples in the longitude direction that are closest to a longitude coordinate corresponding to the second coordinate position, wherein the third unit distance is between a third reference sample and a fourth reference sample in the latitude direction, and wherein the third reference sample and the fourth reference sample are two reference samples in the m reference samples in the latitude direction that are closest to a latitude coordinate corresponding to the second coordinate position; and determining the interpolation weight of each of the m reference samples based on the first unit distance and the first spherical distance.

6. The image interpolation method of claim 5, further comprising:

determining a first weight component of each of the m reference samples based on the second unit distance and the second spherical distance;

determining a second weight component of each of the m reference samples based on the third unit distance and the third spherical distance; and determining the interpolation weight of each of the m reference samples based on the first weight component of each of the m reference samples and the second weight component of each of the m reference samples.

7. The image interpolation method of claim 3, wherein longitude coordinate values change fastest in the longitude direction, and wherein latitude coordinate values change fastest in the latitude direction.

8. The image interpolation method of claim 1, wherein the second coordinate position is of a point consisting of a horizontal coordinate and a vertical coordinate in a planar coordinate system of the planar image, or is of a point consisting of a longitude coordinate and a latitude coordinate in a geographic coordinate system of the curved surface image.

9. A terminal device comprising:

a memory configured to store instructions; and a processor coupled to the memory, wherein the instructions cause the processor to be configured to:

determine, based on a first coordinate position of a to-be-interpolated sample in a target image, a second coordinate position of the to-be-interpolated sample in a source image, wherein the source image is a curved surface image or a planar image in a spherical image format;

determine m reference samples located in the source image based on the second coordinate position, wherein m is a positive integer;

determine an interpolation weight of each of the m reference samples for the to-be-interpolated sample based on a first spherical distance between a third coordinate position of each of the m reference samples and the second coordinate position; and determine a first pixel value of the to-be-interpolated sample based on a second pixel value corresponding to each of the m reference samples and the interpolation weight of each of the m reference samples to obtain the target image.

10. A computer program product comprising computer-executable instructions for storage on a non-transitory computer-readable storage medium that, when executed by a processor, cause an apparatus to:

determine, based on a first coordinate position of a to-be-interpolated sample in a target image, a second coordinate position of the to-be-interpolated sample in a source image, wherein the source image is a curved surface image or a planar image in a spherical image format;

determine m reference samples located in the source image based on the second coordinate position, wherein m is a positive integer;

determine an interpolation weight of each of the m reference samples for the to-be-interpolated sample based on a first spherical distance between a third coordinate position of each of the m reference samples and the second coordinate position; and determine a first pixel value of the to-be-interpolated sample based on a second pixel value corresponding to each of the m reference samples and the interpolation weight of each of the m reference samples to obtain the target image.

11. The terminal device of claim 9, wherein the source image is the planar image, and wherein either spherical image formats corresponding to the source image and the target image are different or image resolutions corresponding to the source image and the target image are different.

12. The terminal device of claim 9, wherein the instructions further cause the processor to be configured to obtain the m reference samples by sampling around the second coordinate position along a longitude direction or a latitude direction, and wherein vertical coordinates or latitude coordinates of a first part of the m reference samples are the same or wherein horizontal coordinates or longitude coordinates of a second part of the m reference samples are the same.

13. The terminal device of claim 12, wherein the source image is the planar image, wherein the second coordinate position is of a point consisting of a horizontal coordinate and a vertical coordinate in a planar coordinate system, and wherein the instructions further cause the processor to be configured to:

determine the longitude direction based on a first position mapping relationship between a geographic coordinate system and the planar coordinate system, wherein latitude values corresponding to second coordinate positions of the source image in the longitude direction remain unchanged; and determine the latitude direction based on a second position mapping relationship between the geographic coordinate system and the planar coordinate system, wherein longitude values corresponding to the second coordinate positions in the latitude direction remain unchanged.

14. The terminal device of claim 12, wherein longitude coordinate values change fastest in the longitude direction, and wherein latitude coordinate values change fastest in the latitude direction.

15. The terminal device of claim 9, wherein the first spherical distance of each of the m reference samples comprises a second spherical distance and a third spherical distance, wherein the second spherical distance is between the third coordinate position and the second coordinate position in a longitude direction, wherein the third spherical distance is between the third coordinate position and the second coordinate position in a latitude direction, and wherein the instructions further cause the processor to be configured to:

determine a first unit distance comprising a second unit distance and a third unit distance, wherein the second unit distance is between a first reference sample and a second reference sample in the longitude direction, wherein the first reference sample and the second reference sample are two reference samples in the m reference samples in the longitude direction that are closest to a longitude coordinate corresponding to the second coordinate position, wherein the third unit distance is between a third reference sample and a fourth reference sample in the latitude direction, and wherein the third reference sample and the fourth reference sample are two reference samples in the m reference samples in the latitude direction that are closest to a latitude coordinate corresponding to the second coordinate position; and determine the interpolation weight of each of the m reference samples based on the first unit distance and the first spherical distance.

16. The terminal device of claim 15, wherein the instructions further cause the processor to be configured to:

determine a first weight component of each of the m reference samples based on the second unit distance and the second spherical distance;

determine a second weight component of each of the m reference samples based on the third unit distance and the third spherical distance; and determine the interpolation weight of each of the m reference samples based on the first weight component of each of the m reference samples and the second weight component of each of the m reference samples.

17. The terminal device of claim 9, wherein the second coordinate position is of a point consisting of a horizontal coordinate and a vertical coordinate in a planar coordinate system of the planar image, or is of a point consisting of a longitude coordinate and a latitude coordinate in a geographic coordinate system of the curved surface image.

18. The computer program product of claim 10, wherein the source image is the planar image, and wherein either spherical image formats corresponding to the source image and the target image are different or image resolutions corresponding to the source image and the target image are different.

19. The computer program product of claim 10, wherein the computer-executable instructions further cause the apparatus to obtain the m reference samples through sampling around the second coordinate position along a longitude direction or a latitude direction, wherein vertical coordinates or latitude coordinates of a first part of the m reference samples are the same, or wherein horizontal coordinates or longitude coordinates of a second part of the m reference samples are the same.

20. The computer program product of claim 19, wherein the source image is the planar image, wherein the second coordinate position is of a point consisting of a horizontal coordinate and a vertical coordinate in a planar coordinate system, and wherein the computer-executable instructions further cause the apparatus to:

determine the longitude direction based on a first position mapping relationship between a geographic coordinate system and the planar coordinate system, wherein latitude values corresponding to second coordinate positions of the source image in the longitude direction remain unchanged; and determine the latitude direction based on a second position mapping relationship between the geographic coordinate system and the planar coordinate system, wherein longitude values corresponding to the second coordinate positions in the latitude direction remain unchanged.

* * * * *